United States Patent
Ju et al.

(10) Patent No.: US 11,133,563 B2
(45) Date of Patent: Sep. 28, 2021

(54) METHOD OF DETECTING SWELLING OF BATTERY USING PRESSURE SENSOR AND ELECTRONIC DEVICE USING THE METHOD

(71) Applicant: SAMSUNG ELECTRONICS CO., LTD., Suwon-si (KR)

(72) Inventors: Hyoungyong Ju, Suwon-si (KR); Mooyoung Kim, Seoul (KR); Hyoseok Na, Yongin-si (KR); Hyungsup Byeon, Suwon-si (KR); Cheolho Cheong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 176 days.

(21) Appl. No.: 15/916,425

(22) Filed: Mar. 9, 2018

(65) Prior Publication Data

US 2018/0261824 A1  Sep. 13, 2018

(30) Foreign Application Priority Data

Mar. 10, 2017  (KR) .................. 10-2017-0030750

(51) Int. Cl.
*H01M 10/00* (2006.01)
*H01M 50/578* (2021.01)
(Continued)

(52) U.S. Cl.
CPC ....... *H01M 50/578* (2021.01); *H01M 10/425* (2013.01); *H01M 10/48* (2013.01);
(Continued)

(58) Field of Classification Search
CPC .............. H01M 2/345; H01M 10/425; H01M 2200/20; H01M 2010/4271;
(Continued)

(56) References Cited

U.S. PATENT DOCUMENTS

2012/0293448 A1  11/2012  Dietz
2015/0118525 A1   4/2015  Zheng et al.
(Continued)

FOREIGN PATENT DOCUMENTS

CN  103812090 A  5/2014
CN  105572598 A  5/2016
(Continued)

OTHER PUBLICATIONS

Extended Search Report dated May 3, 2018 in counterpart European Patent Application No. 18160933.0.
(Continued)

*Primary Examiner* — Nicholas P D'Aniello
(74) *Attorney, Agent, or Firm* — Nixon & Vanderhye P.C.

(57) ABSTRACT

An electronic device includes a battery; a display; a touch sensor configured to detect a touch on the display; a pressure sensor disposed between the display and the battery configured to detect a pressure on the display; and a processor, wherein the processor is configured to obtain a pressure signal using the pressure sensor, to identify, in response to the obtaining of the pressure signal, touch information including at least one of an occurrence of a touch signal and a position of the touch signal corresponding to the touch obtained through the touch sensor, and to adjust at least one characteristic related to charging of the battery based on at least a portion of the pressure signal and the touch information.

10 Claims, 20 Drawing Sheets

(51) Int. Cl.
H01M 10/48 (2006.01)
H02J 7/00 (2006.01)
H01M 10/42 (2006.01)

(52) U.S. Cl.
CPC ........ *H02J 7/0047* (2013.01); *H02J 7/00719* (2020.01); *H01M 2010/4271* (2013.01); *H01M 2200/20* (2013.01); *H01M 2220/30* (2013.01)

(58) Field of Classification Search
CPC ............. H01M 2220/30; H01M 10/48; H01M 50/578; G06F 3/0414; H02J 7/009; H02J 7/0047; H02J 7/00719; H04M 1/24; H04M 1/72569; H04M 1/72454; H04M 2250/12; H04M 2001/0204; H04M 2250/22; H04M 2201/34; H04M 2201/80; Y02E 60/10
See application file for complete search history.

(56) References Cited

U.S. PATENT DOCUMENTS

| | | | |
|---|---|---|---|
| 2015/0171483 A1* | 6/2015 | Nenninger | H01M 10/4257 429/50 |
| 2016/0064780 A1 | 3/2016 | Jarvis et al. | |
| 2017/0077717 A1 | 3/2017 | Lundgren et al. | |
| 2018/0006342 A1 | 1/2018 | Lee et al. | |
| 2019/0095026 A1* | 3/2019 | Smith | G02F 1/13338 |
| 2019/0258832 A1* | 8/2019 | Jung | G06F 1/266 |
| 2019/0372376 A1* | 12/2019 | Kwak | H02J 7/0052 |

FOREIGN PATENT DOCUMENTS

| | | |
|---|---|---|
| CN | 205355893 U | 6/2016 |
| CN | 106353682 A | 1/2017 |
| CN | 106374152 A | 2/2017 |
| CN | 106410896 A | 2/2017 |
| CN | 106786931 A | 5/2017 |
| JP | 2010-244844 | 10/2010 |
| KR | 10-2010-0041202 | 4/2010 |
| KR | 10-2016-0145428 | 12/2016 |
| KR | 10-1692694 B1 | 1/2017 |
| KR | 10-1704359 B1 | 2/2017 |

OTHER PUBLICATIONS

Chinese Office Action dated Aug. 24, 2020 for CN Application No. 201810200439.7.
Korean Notice of Allowance dated Jul. 28, 2021 for KR Application No. 10-2017-0030750.

* cited by examiner

METHOD OF DETECTING SWELLING OF BATTERY USING PRESSURE SENSOR AND ELECTRONIC DEVICE USING THE METHOD

CROSS-REFERENCE TO RELATED APPLICATION

This application is based on and claims priority under 35 U.S.C. § 119 to Korean Patent Application No. 10-2017-0030750, filed on Mar. 10, 2017, in the Korean Intellectual Property Office, the disclosure of which is incorporated by reference herein in its entirety.

BACKGROUND

Field

The present disclosure relate to a method of detecting swelling of a battery using a pressure sensor and an electronic device using the method.

Description of Related Art

Nowadays, electronic devices such as mobile terminals are being widely used by a user in real life. For example, by installing functions such as waterproofing and dustproofing, the user may use the electronic device more stably. In addition, because electronic devices such as mobile terminals have high mobility, the role of a battery is very important. For example, by fully securing a capacity of the battery, a use time of the electronic device can increase and safety of the battery is required.

While using the mobile terminal, it may be difficult for the user to determine directly whether the battery of the mobile terminal has swelled. Because of battery swelling, a safety accident such as battery burnout or ignition may occur. Further, because of battery swelling, a battery charge capacity may be reduced and it is difficult for the user to accurately determine the reduction of the battery charge capacity. Therefore, because it is difficult for the user to replace the battery at an appropriate time, a use time of the mobile terminal may be reduced.

SUMMARY

The present disclosure addresses the above problem and provides a method of detecting swelling of a battery using a pressure sensor and an electronic device using the method.

In accordance with an aspect of the present disclosure, an electronic device includes a battery; a display; a touch sensor configured to detect a touch on the display; a pressure sensor disposed between the display and the battery configured to detect a pressure on the display; and a processor, wherein the processor is configured to obtain a pressure signal using the pressure sensor, to identify, in response to the obtaining of the pressure signal, touch information including at least one of an occurrence of a touch signal and a position of the touch signal corresponding to the touch obtained through the touch sensor, and to adjust at least one characteristic related to charging of the battery based on at least a portion of the pressure signal and the touch information.

In accordance with another aspect of the present disclosure, an electronic device includes a battery; a display; a touch sensor configured to detect a touch on the display; a pressure sensor disposed between the display and the battery configured to detect at least one of a touch pressure on the display and a swelling pressure by swelling of the battery; and a processor, wherein the processor is configured to detect a swelling pressure by swelling of the battery using the pressure sensor and to adjust at least one characteristic related to charging of the battery when the swelling pressure satisfies a specified condition.

In accordance with another aspect of the present disclosure, a method of controlling an electronic device includes obtaining a pressure signal using a pressure sensor disposed between a display and a battery and configured to detect a pressure on the display; identifying, in response to the obtaining of the pressure signal, touch information including at least one of an occurrence of a touch signal and a position of the touch signal corresponding to the touch obtained through the touch sensor configured to detect a touch on the display; and adjusting at least one characteristic related to charging of the battery disposed in the electronic device based on at least a portion of the pressure signal and the touch information.

BRIEF DESCRIPTION OF THE DRAWINGS

The objects, features, and advantages of the present disclosure will be more apparent from the following detailed description, taken in conjunction with the accompanying drawings, in which.

DETAILED DESCRIPTION

Figure 1:
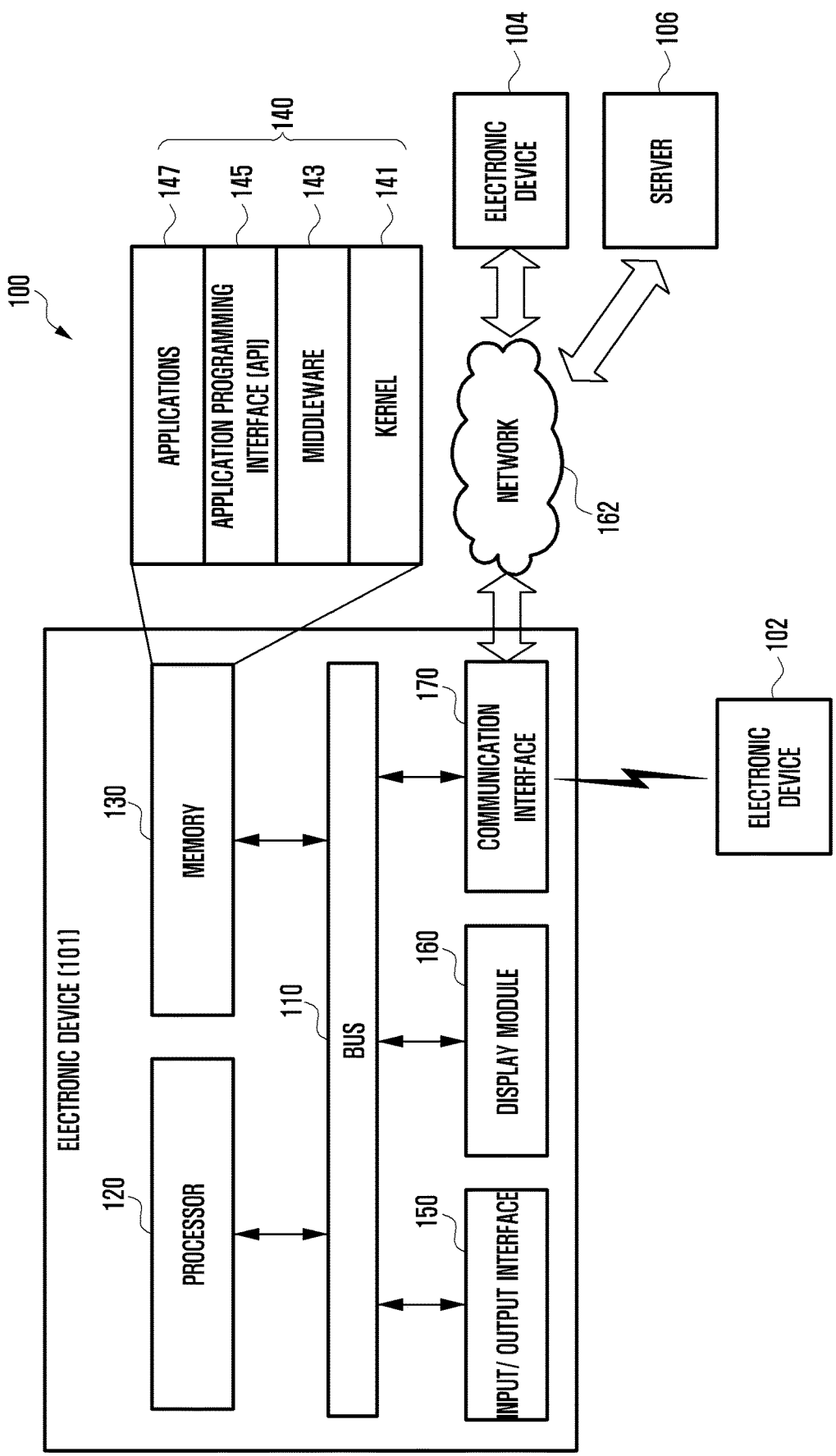
FIG. 1 is a block diagram illustrating a network environment including an electronic device according to various embodiments of the present disclosure.

Hereinafter, various example embodiments of the present disclosure are described in greater detail with reference to the accompanying drawings. While the present disclosure may be embodied in many different forms, specific embodiments of the present disclosure are shown in drawings and are described herein in detail, with the understanding that the present disclosure is not to be considered to be limited thereto. The same reference numerals are used throughout the drawings to refer to the same or like parts.

An expression "comprising" or "may comprise" used in the present disclosure indicates presence of a corresponding function, operation, or element and does not limit an additional at least one function, operation, or element. The term "comprise" or "have" used herein indicates presence of a characteristic, numeral, step, operation, element, component, or combination thereof described in the disclosure and does not exclude presence or addition of at least one other characteristic, numeral, step, operation, element, component, or combination thereof.

In the present disclosure, the term "or" includes any combination or the entire combination of together listed words. For example, "A or B" may include A, B, or A and B.

Expressions such as "a first" and "a second" in the present disclosure may represent various elements of the present disclosure, but do not limit corresponding elements, e.g., do not limit order and/or importance of corresponding elements, but may be used for distinguishing one element from another element. For example, both a first user device and a second user device are user devices and represent different user devices. For example, a first element may be referred to as a second element without deviating from the scope of the present disclosure, and similarly, a second element may be referred to as a first element.

When it is described that a first element is "coupled" to another element, such as a second element, the first element may be "directly coupled" to the second element or "electrically coupled" to the second element through a third element. However, when it is described that a first element is "directly coupled" to a second element, no third element may exist between the first and second elements.

Terms used in the present disclosure are not intended to limit the present disclosure but to illustrate embodiments of the present disclosure. When using in a description of the present disclosure and the appended claims, a singular form includes a plurality of forms unless it is explicitly differently represented.

Unless differently defined, terms including a technical term and a scientific term used herein have the same meaning as may be generally understood by a person of common skill in the art. It should be understood that generally using terms defined in a dictionary have a meaning corresponding to that of a context of related technology and are not understood to have an ideal or excessively formal meaning unless explicitly defined.

In this disclosure, an electronic device may have a communication function. For example, an electronic device may, for example, and without limitation, be a smart phone, a tablet PC, a mobile phone, a video phone, an e-book reader, a desktop PC, a laptop PC, a netbook computer, a PDA (personal digital assistant), a PMP (portable multimedia player), an MP3 player, a portable medical device, a digital camera, or a wearable device, such as an HMD (head-mounted device) in the form of electronic glasses, electronic clothes, an electronic bracelet, an electronic necklace, an electronic appcessory, or a smart watch, or the like.

According to some example embodiments, an electronic device may be a smart home appliance that involves a communication function, such as a TV (television), a DVD (digital video disk) player, audio equipment, a refrigerator, an air conditioner, a vacuum cleaner, an oven, a microwave, a washing machine, an air cleaner, a set-top box, a TV box, such as Samsung HomeSync™, Apple TV™, and Google TV™, a game console, an electronic dictionary, an electronic key, a camcorder, or an electronic picture frame, or the like, but is not limited thereto.

According to some example embodiments, an electronic device may be a medical device, such as MRA (magnetic resonance angiography), MRI (magnetic resonance imaging), CT (computed tomography), and ultrasonography, a navigation device, a GPS (global positioning system) receiver, an EDR (event data recorder), an FDR (flight data recorder), a car infotainment device, electronic equipment for ship, such as a marine navigation system or a gyrocompass), avionics, security equipment, or an industrial or home robot, or the like, but is not limited thereto.

According to some example embodiments, an electronic device may be furniture or part of a building or construction having a communication function, an electronic board, an electronic signature receiving device, a projector, or various measuring instruments, such as a water, electric, gas, or a wave meter, or the like, but is not limited thereto. An electronic device disclosed herein may be one of the above-mentioned devices or any combination thereof. As well understood by those skilled in the art, the above-mentioned electronic devices are not to be considered as a limitation of the present disclosure.

FIG. 1 is a block diagram illustrating an example electronic apparatus in a network environment 100 according to an example embodiment of the present disclosure.

Referring to FIG. 1, the electronic device 101 may include a bus 110, a processor (e.g., including processing circuitry) 120, a memory 130, an input/output interface (e.g., including input/output circuitry) 150, a display 160, and a communication interface (e.g., including communication circuitry) 170.

The bus 110 may be a circuit for interconnecting elements of the electronic device 101 and for allowing a communication, such as by transferring a control message, between the elements.

The processor 120 may include various processing circuitry that can receive commands from the memory 130, the input/output interface 150, the display 160, and the communication interface 170, through the bus 110, can decipher the received commands, and perform operations and/or data processing according to the deciphered commands.

The memory 130 can store commands received from the processor 120 and/or other elements, and/or commands and/or data generated by the processor 120 and/or other elements. The memory 130 may include software and/or programs 140, such as a kernel 141, middleware 143, an application programming interface (API) 145, and an application 147. Each of the programming modules described above may be configured by software, firmware, hardware, and/or any combinations thereof.

The kernel 141 can control and/or manage system resources used for execution of operations and/or functions implemented in other programming modules, such as the middleware 143, the API 145, and/or the applications 147, and can provide an interface through which the middleware 143, the API 145, and/or the applications 147 can access and then control and/or manage an individual element of the electronic apparatus 100.

The middleware 143 can perform a relay function which allows the API 145 and/or the applications 147 to communicate with and exchange data with the kernel 141. In relation to operation requests received from at least one of applications 147, the middleware 143 can perform load balancing in relation to the operation requests by giving a priority in using a system resource, e.g. the bus 110, the processor 120, and/or the memory 130, of the electronic apparatus 100 to at least one application from among the at least one of the applications 147.

The API 145 is an interface through which the applications 147 can control a function provided by the kernel 141 and/or the middleware 143, and may include at least one interface or function for file control, window control, image processing, and/or character control.

The input/output interface 150 may include various input/output circuitry that can receive a command and/or data from a user, and transfer the received command and/or data to the processor 120 and/or the memory 130 through the bus 110. The display 160 can display an image, a video, and/or data to a user.

The communication interface 170 may include various communication circuitry that can establish a communication between the electronic apparatus 100 and another electronic devices 102 and 104 and/or a server 106, and can support short range communication protocols, e.g. a wireless fidelity (WiFi) protocol, a BlueTooth (BT) protocol, and a near field communication (NFC) protocol, communication networks, e.g. Internet, local area network (LAN), wide area network (WAN), a telecommunication network, a cellular network, and a satellite network, a plain old telephone service (POTS), or any other similar and/or suitable communication networks, such as network 162. Additionally or alternatively, the communication interface 170 may establish a short-range communication connection 164 with another device (e.g., electronic device 102). Each of the electronic devices 102 and 104 may be the same type or different types of electronic devices.

Figure 2:
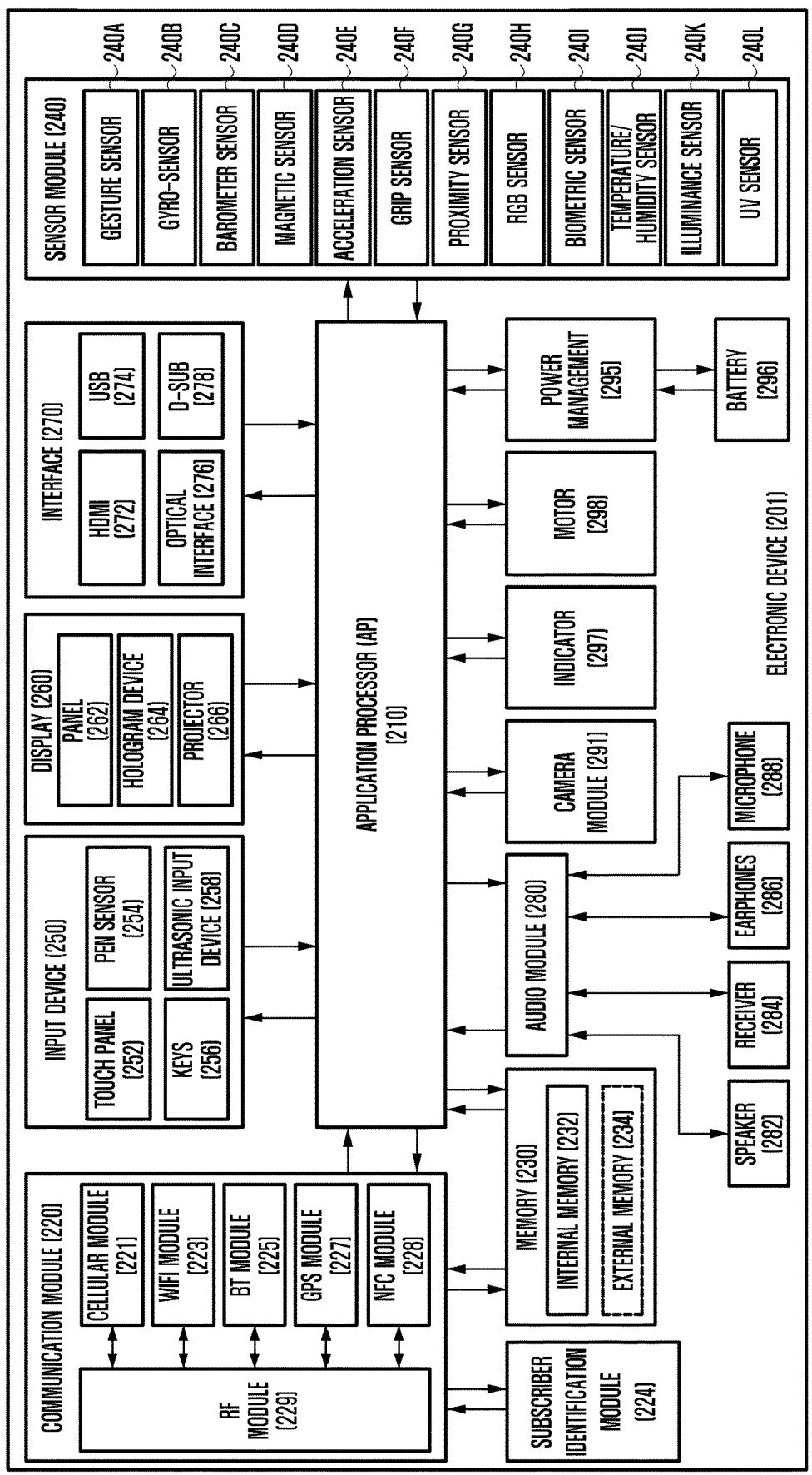
FIG. 2 is a block diagram illustrating a configuration of an electronic device according to various embodiments of the present disclosure.

FIG. 2 is a block diagram illustrating an example electronic device 201 in accordance with an example embodiment of the present disclosure. The electronic device 201 may form all or part of the electronic device 101 illustrated in FIG. 1.

Referring to FIG. 2, the electronic device 201 may include at least one application processor (AP) (e.g., including processing circuitry) 210, a communication module (e.g., including communication circuitry) 220, a subscriber identification module (SIM) card 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The AP 210 may include various processing circuitry and drive an operating system or applications, control a plurality of hardware or software components connected thereto, and also perform processing and operation for various data including multimedia data. The AP 210 may be formed of a system-on-chip (SoC), and may further include a graphic processing unit (GPU).

The communication module 220 may perform a data communication with any other electronic device connected to the electronic device 201 through the network. According to an example embodiment, the communication module 220 may include various communication circuitry therein, such as, for example, and without limitation, one or more of a cellular module 221, a WiFi module 223, a BT module 225, a GPS module 227, an NFC module 228, and an RF (radio frequency) module 229.

The cellular module 221 may offer a voice call, a video call, a message service, or an Internet service through a communication network, such as long term evolution (LTE), LIE-advanced (LTE-A), code division multiple access (CDMA), wideband CDMA (WCDMA), universal mobile telecommunications system (UMTS), WiBro, or global system for mobile communication (GSM). Additionally, the cellular module 221 may perform identification and authentication of the electronic device in the communication network, using the SIM card 224. According to an embodiment, the cellular module 221 may perform at least part of functions the AP 210 can provide, such as a multimedia control function.

According to an embodiment, the cellular module 221 may include a communication processor (CP), and may be formed of an SoC, for example. Although some elements such as the cellular module 221, such as the CP, the memory 230, or the power management module 295 are shown as separate elements being different from the AP 210 in FIG. 2, the AP 210 may be formed to have at least part of the above elements in an embodiment of the present disclosure.

According to an embodiment, the AP 210 or the cellular module 221 may load commands or data, received from a nonvolatile memory connected thereto or from at least one of the other elements, into a volatile memory to process them. Additionally, the AP 210 or the cellular module 221 may store data, received from or created at one or more of the other elements, in the nonvolatile memory.

Each of the WiFi module 223, the BT module 225, the GPS module 227 and the NFC module 228 may include a processor for processing data transmitted or received therethrough. Although FIG. 2 illustrates the cellular module 221, the WiFi module 223, the BT module 225, the GPS module 227 and the NFC module 228 as different blocks, at least two of these modules may be contained in a single IC (integrated circuit) chip or a single IC package, e.g., may be formed as a single SoC.

The RF module 229 may transmit and receive RF signals or any other electric signals, and may include a transceiver, a PAM (power amp module), a frequency filter, or an LNA (low noise amplifier). The RF module 229 may further include any component, e.g., a wire or a conductor, for transmission of electromagnetic waves in a free air space. Although FIG. 2 illustrates that the cellular module 221, the WiFi module 223, the BT module 225, the GPS module 227 and the NFC module 228 share the RF module 229, at least one of these modules may perform transmission and reception of RF signals through a separate RF module in an embodiment of the present disclosure.

The SIM card 224 may be a specific card formed of SIM and may be inserted into a slot formed at a certain location of the electronic device. The SIM card 224 may contain therein an ICCID (integrated circuit card identifier) or an IMSI (international mobile subscriber identity).

The memory 230 may include an internal memory 232 and/or an external memory 234. The internal memory 232 may include at least one of a volatile memory, such as DRAM (dynamic random access memory), SRAM (static RAM), SDRAM (synchronous DRAM), or a nonvolatile memory, such as OTPROM (one time programmable read-only memory), PROM (programmable ROM), EPROM (erasable and programmable ROM), EEPROM (electrically erasable and programmable ROM), mask ROM, flash ROM, NAND flash memory, and NOR flash memory.

According to an example embodiment, the internal memory 232 may have the form of an SSD (solid state drive). The external memory 234 may include a flash drive, e.g., CF (compact flash), SD (secure digital), Micro-SD (micro secure digital), Mini-SD (mini secure digital), xD (extreme digital), or memory stick, and may be functionally connected to the electronic device 201 through various interfaces. The electronic device 201 may further include a storage device or medium such as a hard drive.

The sensor module 240 may measure physical quantity or sense an operating status of the electronic device 201, and then convert measured or sensed information into electrical signals. The sensor module 240 may include at least one of a gesture sensor 240A, a gyro sensor 240B, an atmospheric pressure (barometer) sensor 240C, a magnetic sensor 240D, an acceleration sensor 240E, a grip sensor 240F, a proximity sensor 240G, a color sensor 240H, such as an RGB (red, green, blue) sensor, a biometric (e.g., bio) sensor 240I, a temperature-humidity sensor 240J, an illumination (illuminance) sensor 240K, and a UV (ultraviolet) sensor 240M. Additionally or alternatively, the sensor module 240 may include an E-nose sensor, an EMG (electromyography) sensor, an EEG (electroencephalogram) sensor, an ECG (electrocardiogram) sensor, an IR (infrared) sensor, an iris scan sensor, or a finger scan sensor. The sensor module 240 may include a control circuit for controlling one or more sensors equipped therein.

The input device 250 may include various input circuitry, such as, for example, and without limitation, a touch panel 252, a digital pen sensor 254, a key 256, or an ultrasonic input device 258. The touch panel 252 may recognize a touch input in a capacitive, resistive, infrared, or ultrasonic type manner. The touch panel 252 may further include a control circuit. In case of a capacitive type, a physical contact or proximity may be recognized. The touch panel 252 may further include a tactile layer that offers a tactile feedback to a user.

The digital pen sensor 254 may be formed in the same or similar manner as receiving a touch input or by using a separate recognition sheet. The key 256 may include a physical button, an optical key, or a keypad. The ultrasonic input device 258 is capable of identifying data by sensing sound waves with a microphone (MIC) 288 in the electronic device 201 through an input tool that generates ultrasonic signals, thus allowing wireless recognition. According to an embodiment, the electronic device 201 may receive a user input from any external device connected thereto through the communication module 220.

The display 260 may include a panel 262, a hologram device 264, or a projector 266. The panel 262 may be LCD (liquid crystal display), or AM-OLED (active matrix organic light emitting diode) may have a flexible, transparent or wearable form, and may be formed of a single module with the touch panel 252. The hologram device 264 may project a stereoscopic image in the air using interference of light. The projector 266 may project an image onto a screen, which may be located at the inside or outside of the electronic device 201. According to an embodiment, the display 260 may further include a control circuit for controlling the panel 262, the hologram device 264, and the projector 266.

The interface 270 may include various interface circuitry, such as, for example, and without limitation, an HDMI (high-definition multimedia interface) 272, a USB (universal serial bus) 274, an optical interface 276, and a D-sub (d-subminiature) 278, or the like, and may be contained in the communication interface 160 shown in FIG. 1. Additionally or alternatively, the interface 270 may include an MHL (mobile high-definition link) interface, an SD (secure digital) card/MMC (multi-media card) interface, or an IrDA (infrared data association) interface.

The audio module 280 may perform a conversion between sounds and electric signals. At least part of the audio module 280 may be contained in the input/output interface 140 shown in FIG. 1. The audio module 280 may process sound information inputted or outputted through a speaker 282, a receiver 284, an earphone 286, or the MIC 288.

The camera module 291 is capable of obtaining still images and moving images, and may include at least one image sensor, such as a front sensor or a rear sensor, a lens, an ISP (image signal processor, or a flash, such as LED or xenon lamp.

The power management module 295 may manage electric power of the electronic device 201 and may include a PMIC (power management integrated circuit), a charger IC, or a battery gauge.

The PMIC may be formed of an IC chip or SoC. Charging may be performed in a wired or wireless manner. The charger IC may charge a battery 296 and prevent overvoltage or overcurrent from a charger. According to an embodiment, the charger IC may have a charger IC used for at least one of wired and wireless charging types. A wireless charging type may include a magnetic resonance type, a magnetic induction type, or an electromagnetic type. Any additional circuit for a wireless charging may be further used, such as a coil loop, a resonance circuit, or a rectifier.

The battery gauge may measure the residual amount of the battery 296 and a voltage, current or temperature in a charging process. The battery 296 may store or create electric power therein and supply electric power to the electronic device 201. The battery 296 may be a rechargeable or solar battery.

The indicator 297 may illustrate thereon a current status, such as a booting, message, or recharging status of part or all of the electronic device 201. The motor 298 may convert an electric signal into a mechanical vibration. The electronic device 201 may include a specific processor, such as GPU, for supporting a mobile TV. This processor may process media data that comply with standards of DMB (digital multimedia broadcasting), DVB (digital video broadcasting), or media flow.

Each of the above-discussed elements of the electronic device disclosed herein may be formed of one or more components, and may have various names according to the type of the electronic device. The electronic device disclosed herein may be formed of at least one of the above-discussed elements without some elements or with additional elements. Some of the elements may be integrated into a single entity that still performs the same functions as those of such elements before integrated.

Figure 3:
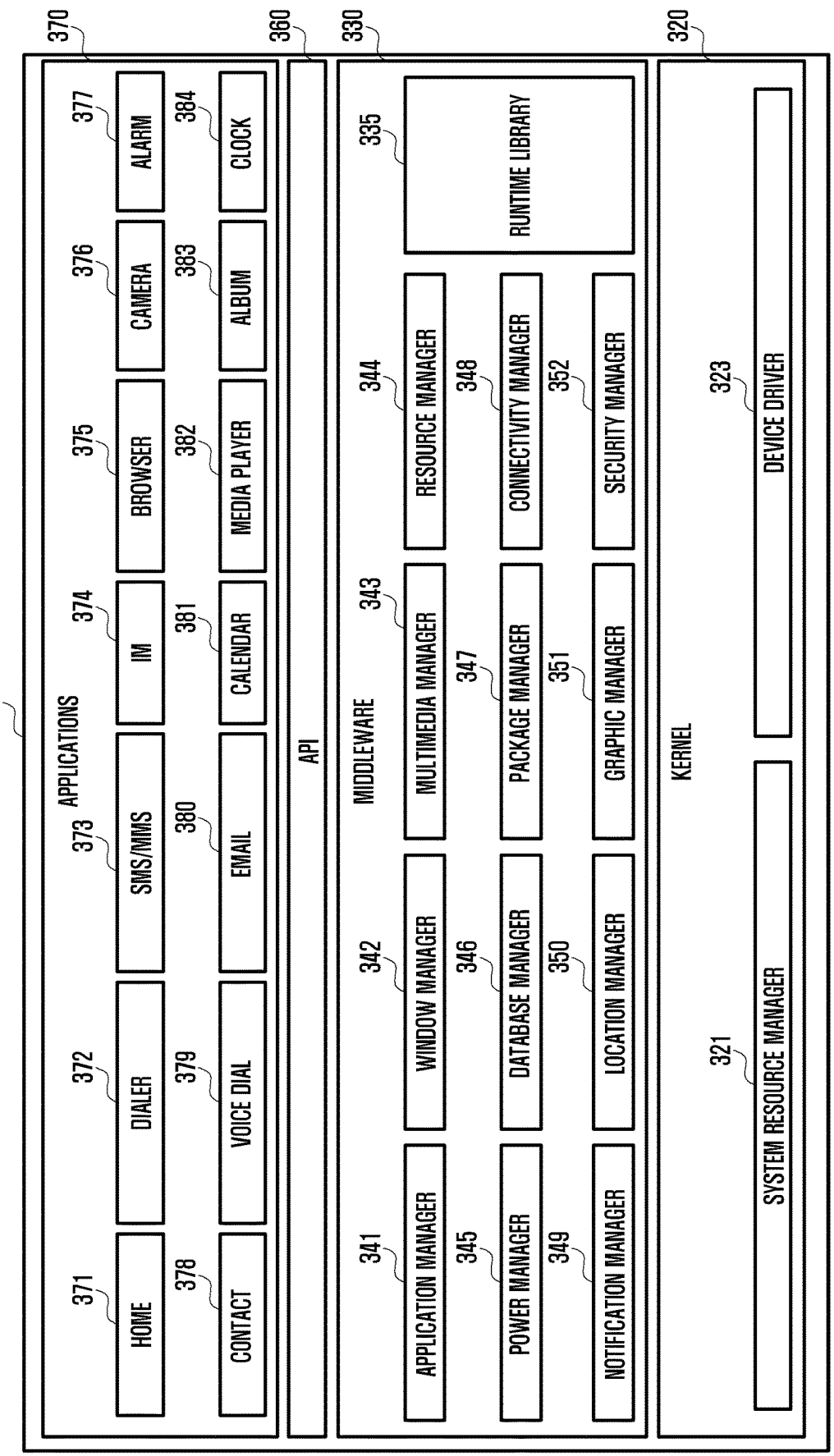
FIG. 3 is a block diagram illustrating a configuration of a program module according to various embodiments of the present disclosure.

FIG. 3 is a block diagram illustrating an example configuration of a programming module 310 according to an example embodiment of the present disclosure.

The programming module 310 may be stored in the electronic device 100 or may be stored in the electronic device 201 illustrated in FIG. 2. At least a part of the programming module 310 may be implemented in software, firmware, hardware, or a combination of two or more thereof. The programming module 310 may be implemented in hardware 201, and may include an OS controlling resources related to an electronic device and/or various applications 370 executed in the OS. For example, the OS may be Android, iOS, Windows, Symbian, Tizen, or Bada.

Referring to FIG. 3, the programming module 310 may include a kernel 320, middleware 330, an API 360, and/or applications 370.

The kernel 320 may include a system resource manager 321 and/or a device driver 323. The system resource manager 321 may include a process manager, a memory manager, and a file system manager. The system resource manager 321 may perform the control, allocation, or recovery of system resources. The device driver 323 may include a display driver, a camera driver, a Bluetooth driver, a shared memory driver, a USB driver, a keypad driver, a Wi-Fi driver, and/or an audio driver, and may further include an inter-process communication (IPC) driver.

The middleware 330 may include multiple modules previously implemented so as to provide a function used in common by the applications 370, and may provide a function to the applications 370 through the API 360 in order to enable the applications 370 to efficiently use limited system resources within the electronic device. For example, as illustrated in FIG. 3, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include a library module used by a complier, in order to add a new function by using a programming language during the execution of the applications 370, and may perform functions which are related to input and output, the management of a memory, or an arithmetic function.

The application manager 341 may manage a life cycle of at least one of the applications 370. The window manager 342 may manage GUI resources used on the screen. The multimedia manager 343 may detect a format used to reproduce various media files and may encode or decode a media file through a codec appropriate for the relevant format. The resource manager 344 may manage resources, such as a source code, a memory, or a storage space, of at least one of the applications 370.

The power manager 345 may operate together with a basic input/output system (BIOS), may manage a battery or power, and may provide power information used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as Wi-Fi and Bluetooth. The notification manager 349 may display or report, to the user, an event such as an arrival message, an appointment, or a proximity alarm, in such a manner as not to disturb the user. The location manager 350 may manage location information of the electronic device. The graphics manager 351 may manage graphic effects, which are to be provided to the user, and/or a user interface related to the graphic effects. The security manager 352 may provide various security functions used for system security and user authentication. According to an embodiment of the present disclosure, when the electronic device has a telephone function, the middleware 330 may further include a telephony manager for managing a voice and/or video telephony call function of the electronic device.

The middleware 330 may generate and use new middleware module through various functional combinations of the above-described internal element modules, may provide modules specialized according to types of OSs to provide differentiated functions, and may dynamically delete some of the existing elements, or may add new elements. Accordingly, the middleware 330 may omit some of the elements described in the embodiments of the present disclosure, may further include other elements, or may replace the some of the elements with elements, each of which performing a similar function and having a different name.

The API 360 is a set of API programming functions, and may be provided with a different configuration according to an OS. In the case of Android or iOS, for example, one API set may be provided to each platform. In the case of Tizen, two or more API sets may be provided to each platform.

The applications 370 may include a preloaded application and/or a third party application, and may include a home 371, dialer 372, a short message service (SMS)/multimedia messaging service (MMS) 373, instant message (IM) 374, browser 375, camera 376, alarm 377, contact 378, voice dial 379, electronic mail (e-mail) 380, calendar 381, media player 382, album 383, and clock application 384, and any other suitable and/or similar application.

At least a part of the programming module 310 may be implemented by instructions stored in a non-transitory computer-readable storage medium. When the instructions are executed by one or more processors, the one or more processors may perform functions corresponding to the instructions. The non-transitory computer-readable storage medium may be the memory 220. At least a part of the programming module 310 may be executed by the one or more processors 210, and may include a module, a program, a routine, a set of instructions, and/or a process for performing one or more functions.

Figure 4:
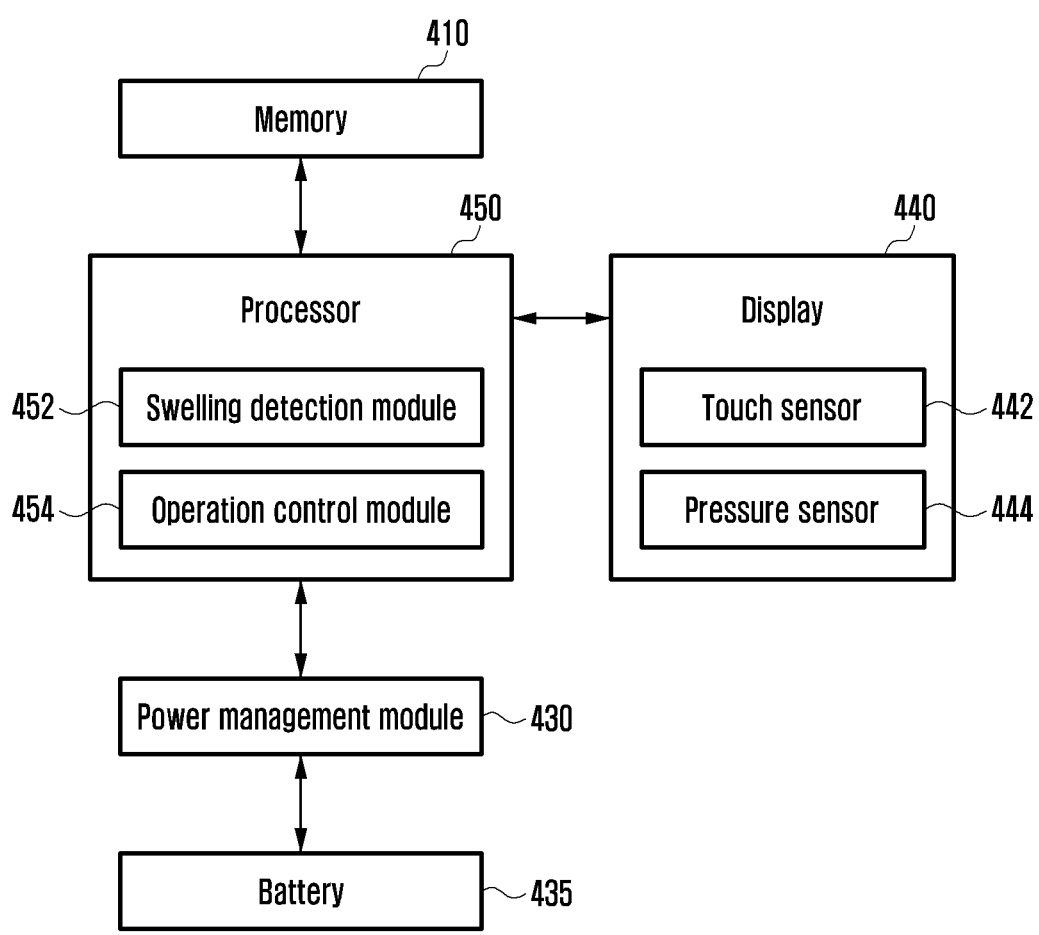
FIG. 4 is a block diagram illustrating an electronic device that can detect swelling of a battery according to various embodiments of the present disclosure.

FIG. 4 is a block diagram illustrating an electronic device that can detect battery swelling according to various embodiments of the present disclosure.

With reference to FIG. 4, according to various embodiments of the present disclosure, an electronic device 101 may include a memory 410 (e.g., 230), power management module 430 (e.g., 295), battery 435 (e.g., 296), display 440 (e.g., 260), and processor 450 (e.g., 210). For example, the power management module 430 may receive a control signal from the processor 450 (e.g., an operation control module 454) to perform a charging control operation of the battery 435. A technical characteristic of other modules or elements may be found in a description described with reference to FIG. 2.

According to various embodiments of the present disclosure, the display 440 of the electronic device 101 may include a touch sensor 442 and a pressure sensor 444. For example, the electronic device 101 may process a touch input in the display 440 based on an input signal obtained through the touch sensor 442. Further, the electronic device 101 may process information about a pressure applied to the display 440 based on an input signal obtained through the pressure sensor 444.

According to various embodiments of the present disclosure, the processor 450 of the electronic device 101 may include a swelling detection module (e.g., including processing circuitry and/or program elements) 452 and an operation control module (e.g., including processing circuitry and/or program elements) 454.

According to various embodiments of the present disclosure, the swelling detection module 452 may detect swelling of the battery 435 based on a signal obtained through the pressure sensor 444 included in the display 440. For example, when intensity of a pressure signal obtained through the pressure sensor 444 is large, the swelling detection module 452 may determine that a swelling level of the battery 435 is large. According to an embodiment, the swelling detection module 452 may detect swelling of the battery 435 in consideration of at least one of an internal temperature and/or an external temperature of the electronic device 101, a signal obtained through the touch sensor 442, and time based information as well as a signal obtained through the pressure sensor 444. Further, the swelling detection module 452 may obtain battery related information (e.g., the charge and discharge number) using a circuit (system on chip (SoC)) disposed within the battery to consider at least a portion of the information when determining battery swelling. For reference, a structural relation between the display 440, the pressure sensor 444, and the battery 435 and various embodiments of detecting battery swelling will be described in greater detail below with reference to the following drawings.

According to various embodiments of the present disclosure, the operation control module 454 may control an operation of the electronic device 101 (e.g., the power management module 430) based on swelling related information (e.g., swelling level, start time point of swelling, time in which swelling is maintained, danger level according to a swelling level) about the battery 435 generated in the swelling detection module 452. For example, the operation control module 454 may provide information about battery swelling to the user. Further, the operation control module 454 may control charging of the battery 435 based on a battery swelling type. For example, a charge current or a charge voltage of the battery 435 being charged may be adjusted. For another example, charging of the battery 435 being charged may be stopped or charging of the battery may be limited from the start. For reference, various embodiments that control an operation of the electronic device 101 based on swelling related information of the battery 435 will be described in detail with reference to the following drawings.

Figure 5A:
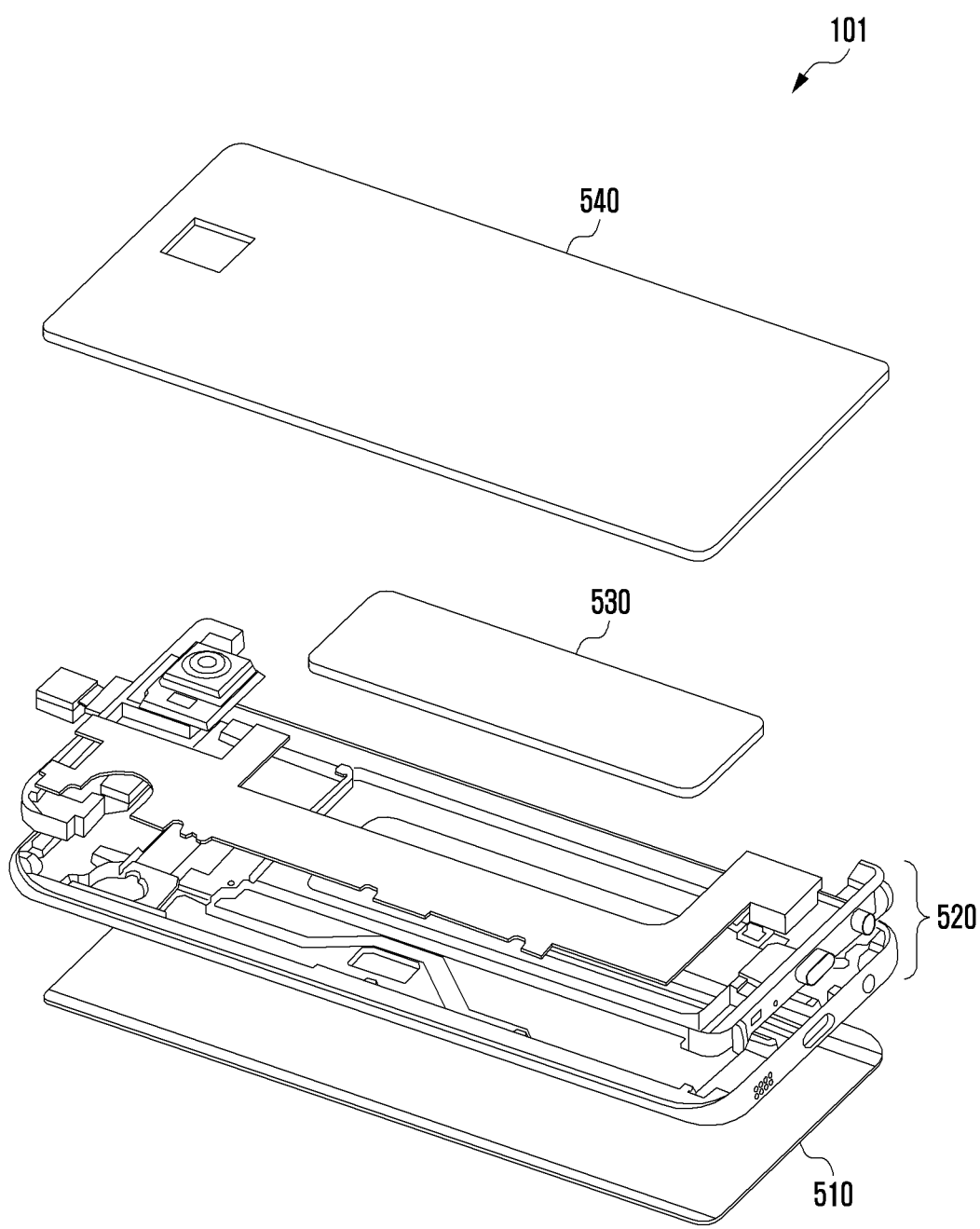
FIGS. 5A and 5B are diagrams illustrating a structure of an electronic device according to various embodiments of the present disclosure.
Figure 5B:
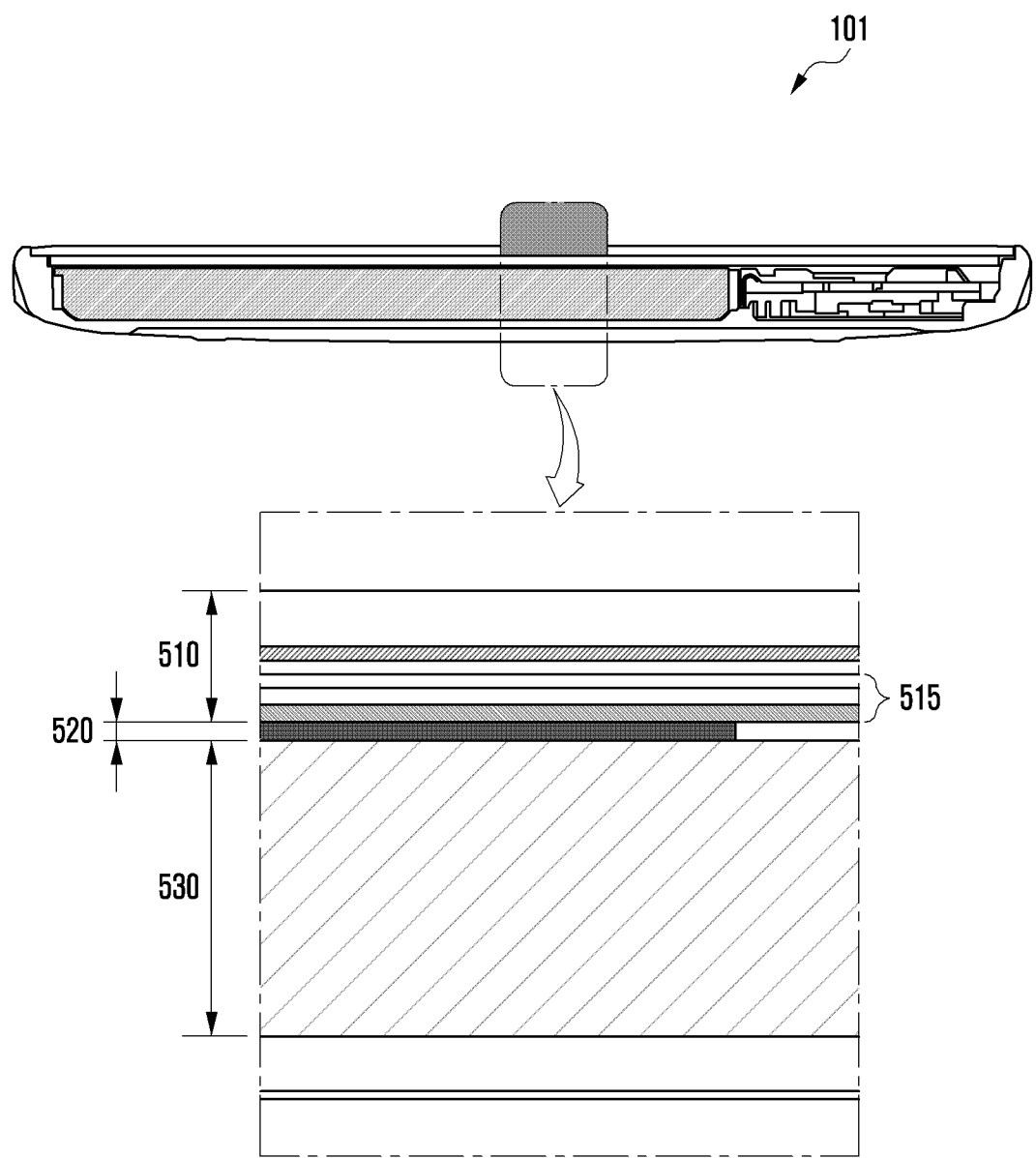

FIGS. 5A and 5B are diagrams illustrating a structure of an electronic device according to various embodiments of the present disclosure.

With reference to FIG. 5A, according to various embodiments of the present disclosure, the electronic device 101 may mount a battery 530 therein. According to an embodiment, the battery 530 of the electronic device 101 may be a built-in battery. The battery 530 of the electronic device 101 may have a form in which it cannot be separated and replaced by the user.

According to various embodiments of the present disclosure, the electronic device 101 may be disposed in order from below of a display 510, a frame or at least one element (e.g., a processor, a memory, a printed circuit board (PCB), a flexible printed circuit board (FPCB), bracket) 520, and a rear case 540. For example, the battery 530 may be mounted at a rear surface of the display 510.

FIG. 5B of the present disclosure shows a cross-section of the electronic device 101 according to various embodiments of the present disclosure. For example, at a cross-section of the battery 530, the display 510 and the battery 530 may be disposed in order from above of the display 510 and the battery 530.

According to various embodiments of the present disclosure, a swelling gap 520 may be formed between the display 510 and the battery 530 of the electronic device 101. For example, a thickness of a lithium (Li) ion battery mounted in the electronic device 101 may be naturally changed according to charging and discharging. When the display 510 and the battery 530 come in close contact with each other without the swelling gap 520, the electronic device 101 may be widened or twisted according to a thickness change. Thereby, the electronic device 101 may be damaged, and problems may arise in waterproofing and dustproofing functions.

According to various embodiments of the present disclosure, the display 510 of the electronic device 101 may include a pressure sensor 515. For example, the pressure sensor 515 may be located at a lower layer of a plurality of layers of the display 510 and at an upper portion of the battery 530. The electronic device 101 may detect swelling of the battery 530 through the pressure sensor 515 located at a lower portion of the display 510. For example, when the battery 530 has swelled beyond the swelling gap 520, the pressure sensor 515 may detect a pressure (e.g., swelling pressure) by swelling of the battery 530. That is, because the battery 530 of the electronic device 101 is mounted at a rear surface of the display 510, when battery swelling occurs, the display 510 at an upper portion of the battery 530 receives a pressure upward from a lower portion; thus, the electronic device 101 may detect swelling of the battery 530.

Figure 6A:
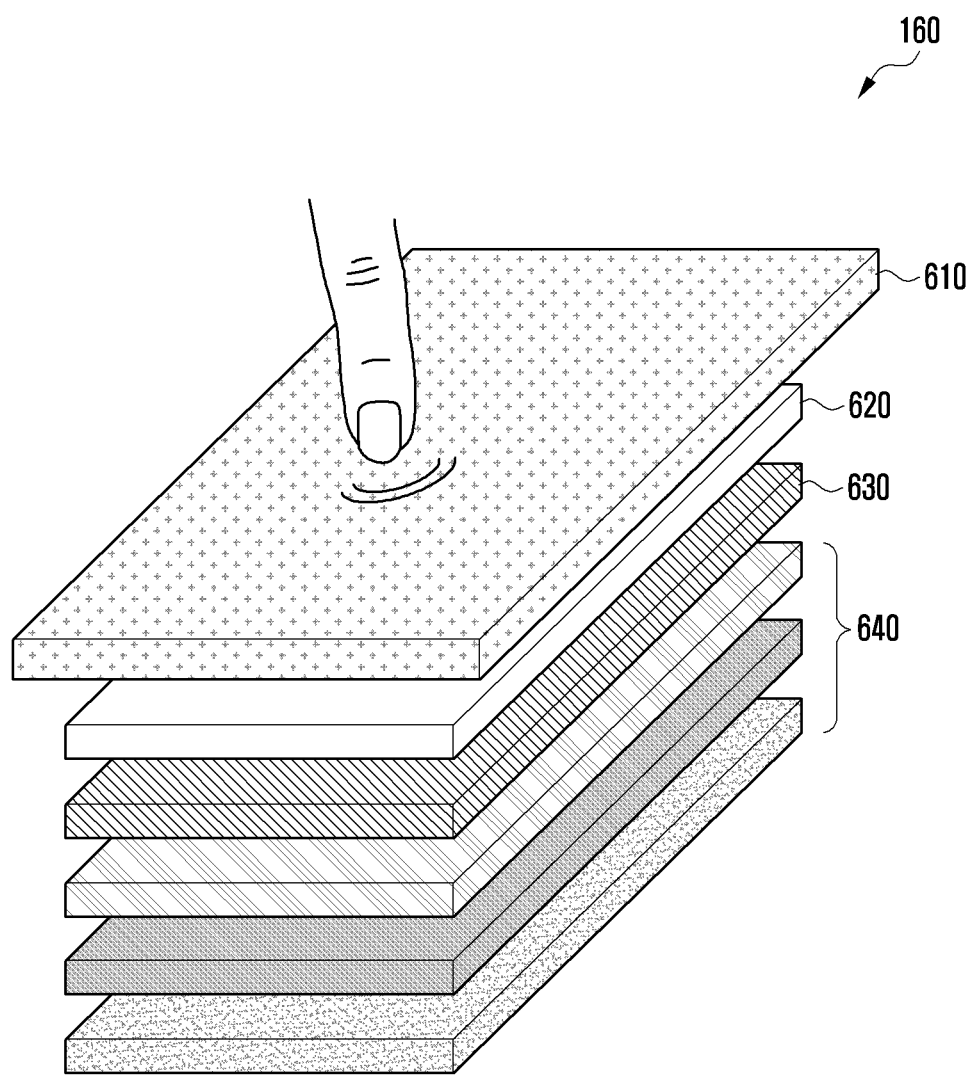
FIGS. 6A and 6B are diagrams illustrating a display structure of an electronic device according to various embodiments of the present disclosure.
Figure 6B:
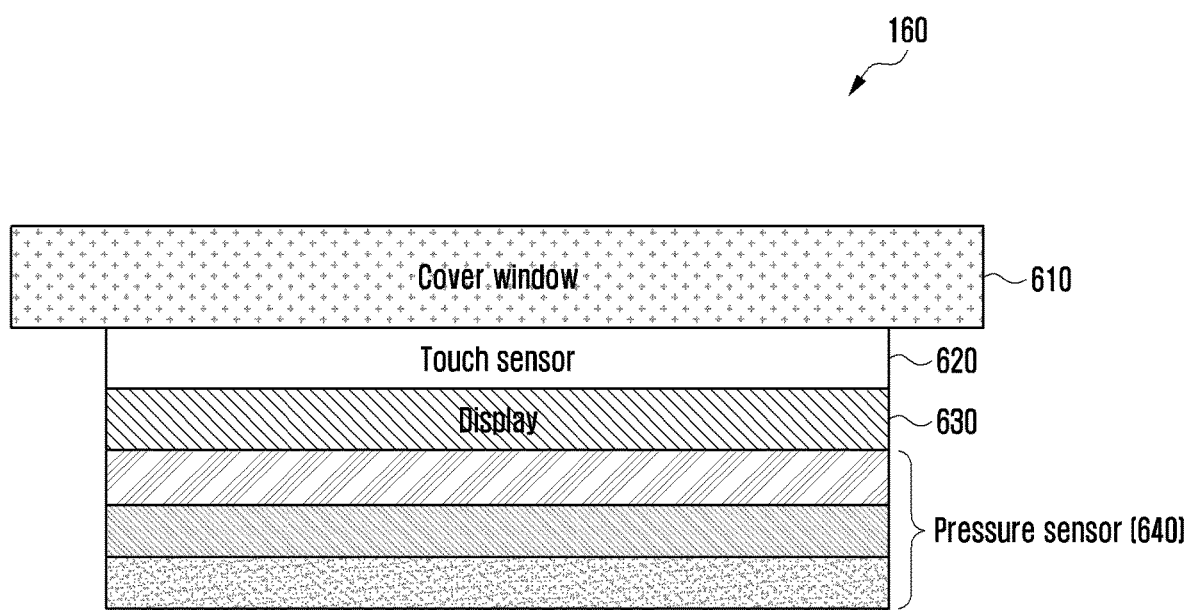

FIGS. 6A and 6B are diagrams illustrating a display structure of an electronic device according to various embodiments of the present disclosure.

With reference to FIGS. 6A and 6B, according to various embodiments of the present disclosure, the display 160 of the electronic device 101 may have a plurality of layer structures. For example, the display 160 of the electronic device 101 may have a layer structure in order from above of a cover window 610, touch sensor 620, display 630 (e.g., display element (organic light emitting diode (OLED), liquid crystal display (LCD), or the like, but is not limited thereto), and pressure sensor 640. For example, the cover window 610 may protect the electronic device 101 from an external impact or a foreign substance.

According to various embodiments of the present disclosure, the pressure sensor 640 of the electronic device 101 may, for example, and without limitation, be implemented with various types of a capacitive type, inductive type, strain gauge type, and piezo type, or the like. For example, a structure of the pressure sensor may be variously changed according to a type of the pressure sensor 640. For reference, various structures of the pressure sensor 640 will be described with reference to FIGS. 7 and 8.

Figure 7A:
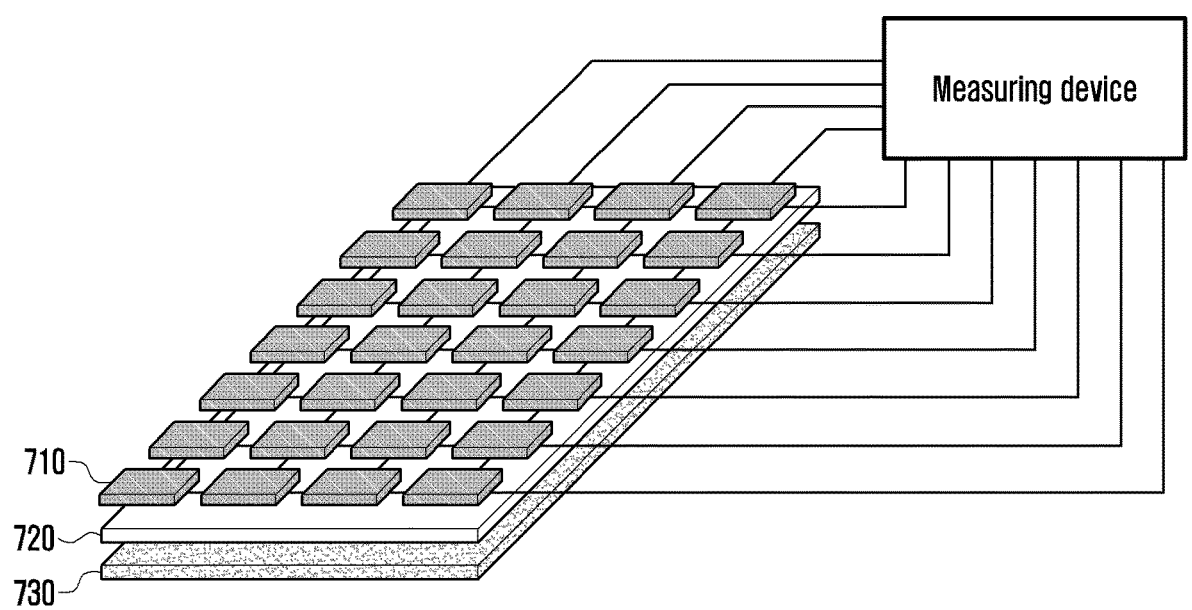
FIGS. 7A, 7B and 7C are diagrams illustrating various structures of a pressure sensor included in a display of an electronic device according to various embodiments of the present disclosure.
Figure 7B:
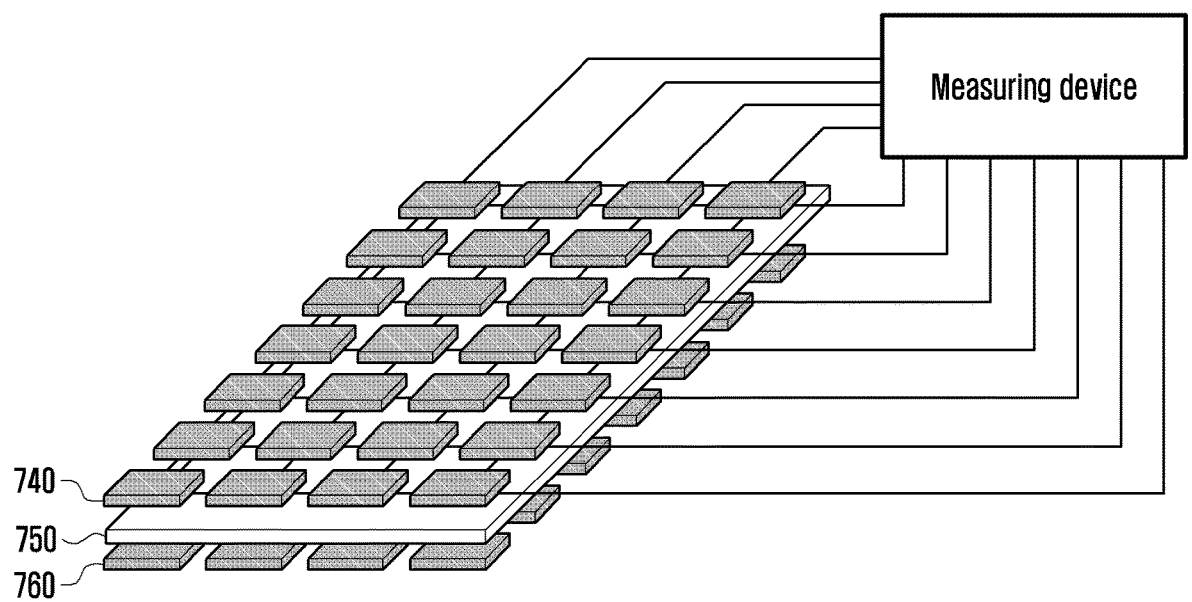
Figure 7C:
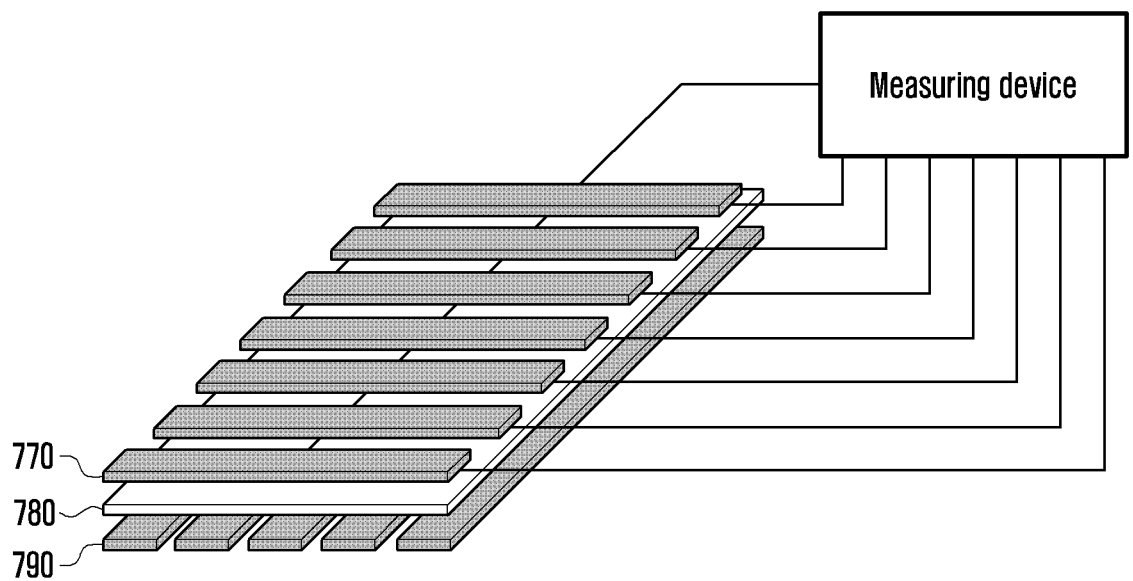

FIGS. 7A, 7B and 7C are diagrams illustrating various structures of a pressure sensor included in a display of an electronic device according to various embodiments of the present disclosure.

According to various embodiments of the present disclosure, in order to increase accuracy of battery swelling detection, the pressure sensor may be implemented into various structures. For example, when a region of electrodes of the pressure sensor is divided into several regions, the electronic device 101 may more accurately determine a pressure detection position. The electronic device 101 may more accurately determine battery swelling through information about the pressure detection position. Hereinafter, a capacitance type pressure sensor among the pressure sensors of the electronic device 101 will be described in greater detail below as an example.

With reference to FIG. 7A, according to various embodiments of the present disclosure, the display 160 of the electronic device 101 may be formed in a first structure of a capacitance type pressure sensor. For example, a capacitance type pressure sensor may include a first electrode 710, dielectric layer 720, and second electrode 730. The capacitance type pressure sensor may detect a pressure based on a change in a distance between the first electrode 710 and the second electrode 730 corresponding to a pressure applied to the display 160. For example, the electronic device 101 may detect a pressure (e.g., a magnitude of a pressure) through a change in a value of capacitance C by the distance change. For example, because the capacitance is inversely proportional to distance, the capacitance may increase as the distance between the first electrode 710 and the second electrode 720 reduces.

With reference to FIG. 7A, according to various embodiments of the present disclosure, the display 160 of the electronic device 101 may be include a self capacitance type pressure sensor. According to various embodiments, the self capacitance type pressure sensor may include a first electrode 710 in a plurality of repeated polygon (or circle) forms, a second electrode 730 extended in one body across an entire region to correspond to the plurality of repeated polygons, and a dielectric layer 720 disposed between the first electrode 710 and the second electrode 730. For example, the self capacitance type pressure sensor may detect a pressure based on a change in capacitance between each partial electrode (e.g., a polygonal or circular partial electrode) of the first electrode 710 and the second electrode 730. Here, positions, directions, or forms of the first electrode 710 and the second electrode 730 may be changed. For reference, at least one wire connected to a measuring device (e.g., including measuring circuitry) and the second electrode 730 are randomly omitted for a brief description of the drawing, but they may be substantially connected in an implementation of the disclosure.

With reference to FIG. 7B, according to various embodiments of the present disclosure, the display 160 of the electronic device 101 may be formed, for example, and without limitation, in a second structure of a capacitance type pressure sensor. For example, the capacitance type pressure sensor may include a first electrode 740, dielectric layer 750, and second electrode 760. According to an embodiment, the second electrode 760 may, for example, and without limitation, be a lattice electrode or a polygonal electrode, similarly to the first electrode 740. The capacitance type pressure sensor may detect a pressure based on a change in a distance between the first electrode 740 and the second electrode 760 corresponding to a pressure applied to the display 160. For example, the capacitance type pressure sensor may detect a pressure (e.g., a magnitude of the pressure) through a change in a value of capacitance C by the distance change. For example, because the capacitance is inversely proportional to distance, the capacitance may increase as the distance between the first electrode 740 and the second electrode 760 reduces. For reference, at least one wire connected to a measuring device and the second electrode 760 are randomly omitted for a brief description of the drawing, but they may be substantially connected in an implementation of the disclosure.

With reference to FIG. 7C, according to various embodiments of the present disclosure, the display 160 of the electronic device 101 may be formed, for example, and without limitation, in a third structure of a capacitance type pressure sensor. For example, the capacitance type pressure sensor may include a first electrode 770, dielectric layer 780, and second electrode 790. The capacitance type pressure sensor may detect a pressure based on a change in a distance between the first electrode 770 and the second electrode 790 corresponding to a pressure applied to the display 160. For example, the capacitance type pressure sensor may detect a pressure (e.g., a magnitude of the pressure) through a change in a value of capacitance C by the distance change. For example, because the capacitance is inversely proportional to distance, the capacitance may increase as the distance between the first electrode 770 and the second electrode 790 reduces.

With reference to FIG. 7C, according to various embodiments of the present disclosure, the display 160 of the electronic device 101 may include a mutual capacitance type pressure sensor. According to various embodiments, the mutual capacitance type pressure sensor may include a first electrode 770 extended in a first direction, a second electrode 790 extended in a second direction substantially perpendicular to the first direction, and a dielectric layer 780 disposed between the first electrode 770 and the second electrode 790. For example, the mutual capacitance type pressure sensor may detect a pressure based on a capacitance change between the first electrode 770 and the second electrode 790 at an intersecting point of the first electrode 770 and the second electrode 790. Here, positions, directions, or forms of the first electrode 770 and the second electrode 790 may change. For reference, at least one wire connected to a measuring device (e.g., including measuring circuitry) and the second electrode 790 are randomly omitted for a brief description of the drawing, but they may be substantially connected in an implementation of the disclosure.

According to various embodiments of the present disclosure, a structure of FIGS. 7A to 7C may be applied to a piezoelectric type pressure sensor. For example, the piezoelectric type pressure sensor may include first electrodes 710, 740, and 770; piezoelectric materials 720, 750, and 780 (e.g., piezoelectric element (element representing an electric characteristic corresponding to a pressure); and second electrodes 730, 760, and 790.

According to various embodiments of the present disclosure, the first electrodes 710, 740, and 770 or the second electrodes 730, 760, and 790 may, for example, be opaque or transparent. That is, when viewing the pressure sensor, an object disposed in a direction opposite to that of the pressure sensor may be visible (e.g., transparent) or not visible (e.g., opaque).

According to various embodiments of the present disclosure, when the first electrodes 710, 740, and 770 or the second electrodes 730, 760, and 790 are opaque, the first electrode 710, 740, and 770 or the second electrode 730, 760, and 790 may, for example, and without limitation, include at least one or two combinations of copper (Cu), silver (Ag), magnesium (Mg), and titanium (Ti).

According to various embodiments of the present disclosure, when the first electrodes 710, 740, and 770 or the second electrodes 730, 760, and 790 are transparent, the first electrodes 710, 740, and 770 or the second electrodes 730, 760, and 790 may, for example, and without limitation, include at least one or two combinations of indium tin oxide (ITO), indium zinc oxide (IZO), a polymer conductor, graphene, and an opaque wiring pattern of a specific line width or less (e.g., Ag nanowires, metal mesh).

According to various embodiments of the present disclosure, the dielectric layers 720, 750, and 780 may, for example, and without limitation, include at least one of silicon, air, foam, membrane, optically clear adhesive (OCA), sponge, rubber, ink, and polymer (e.g., polycarbonate (PC), polyethylene terephthalate (PET)).

According to various embodiments of the present disclosure, the electronic device 101 may determine battery swelling based on a pressure detection position through a pressure sensor having a structure of, for example, FIGS. 7A to 7C. For example, when an input signal of the pressure sensor corresponding to a battery mounting position is changed, the electronic device 101 may detect swelling of the battery. Here, when analyzing the input signal of the pressure sensor, for the pressure sensor of a position in which much heat generates, an input signal value acquired by the pressure sensor may be corrected using a correction table between a temperature and the input signal of the pressure sensor.

According to various embodiments of the present disclosure, the electronic device 101 may measure a sensor value from at least one pressure sensor corresponding to a battery mounting position through a pressure sensor having a structure of, for example, FIGS. 7A to 7C. When a predetermined pressure or more is detected in comparison with a previously measured sensor value (or a reference value) under the same condition (e.g., temperature), the electronic device 101 may determine this to be battery swelling.

According to various embodiments of the present disclosure, the electronic device 101 may distinguish at least one pressure sensor (e.g., a first group) of a position corresponding to a battery mounting position and at least one pressure sensor (e.g., a second group) of a position that does not correspond to a battery mounting position through a pressure sensor having a structure of, for example, FIGS. 7A to 7C. For example, the electronic device 101 may obtain at least one pressure representative value for each of the first group and the second group. The electronic device 101 may compare a pressure representative value of the first group with a pressure representative value of the second group, and when the difference between two values is equal to or greater than a predetermined value, the electronic device 101 may determine this to be battery swelling. Here, the representative value may, for example, and without limitation, include an average, standard deviation, dispersion, median value, maximum value, minimum value, percentile (e.g., 1st percentile, 3rd percentile), outlier, and extreme value.

According to various embodiments of the present disclosure, the electronic device 101 may measure a sensor value with a plurality of pressure sensors corresponding to a battery mounting position through a pressure sensor having a structure of, for example, FIGS. 7A to 7C. For example, the electronic device 101 may measure sensor values with each pressure sensor corresponding to each region of the battery and determine swelling of each region of the battery based on a distribution of the sensor values.

According to various embodiments of the present disclosure, the electronic device 101 may detect a case in which a difference between a maximum value and a minimum value of a sensor value measured by each pressure sensor is a predetermined value or more or a case of representing a pressure distribution of a type different from that of general battery swelling through the pressure sensor having a structure of, for example, FIGS. 7A to 7C to determine a battery swelling type. For example, when only an upper portion of the battery swells by a predetermined value or more and when the center or a lower portion of the battery does not swell, the electronic device 101 may determine this to be abnormal battery swelling. That is, when only a specific portion of the battery swells and when other portions of the battery do not swell, the electronic device 101 may determine that leakage has occurred at a corresponding position. The electronic device 101 may determine a battery swelling type in consideration of a battery swelling speed as well as a battery swelling position.

According to various embodiments of the present disclosure, to accurately determine swelling of the battery, the electronic device 101 may detect a pressure when there is no user input (touch, shock, vibration, etc.) therein using a sensor (e.g., touch sensor, acceleration sensor, audio sensor) thereof.

According to various embodiments of the present disclosure, a pressure sensor having a structure of, for example, FIGS. 7A to 7C may be replaced with a pressure sensor of another structure that can implement an object or effect of the present disclosure, and the same object or effect may be implemented through a pressure sensor of another structure.

Figure 8:
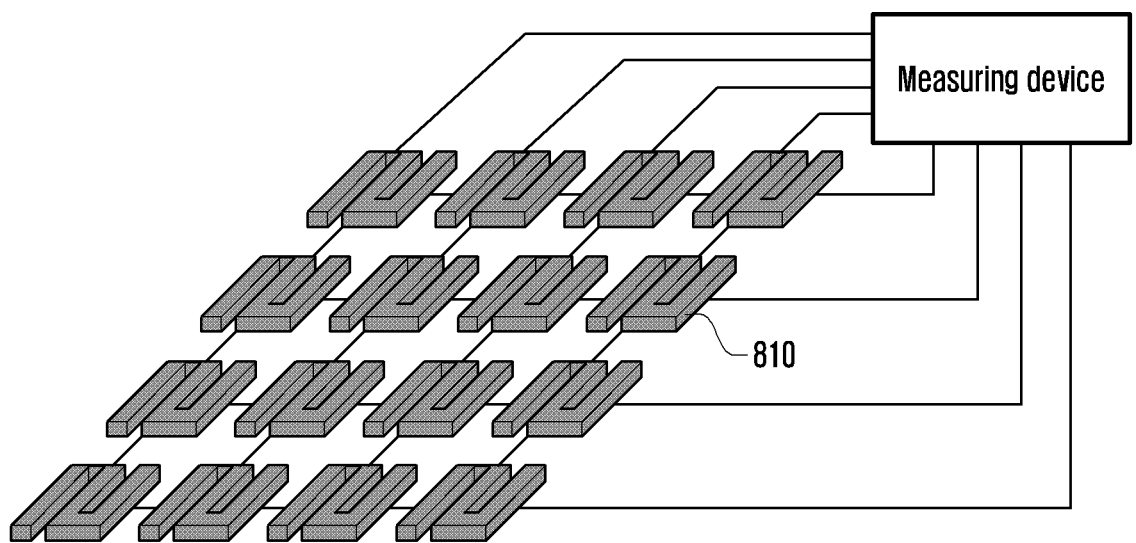
FIG. 8 is a diagram illustrating various structures of a pressure sensor included in a display of an electronic device according to various embodiments of the present disclosure.

FIG. 8 is a diagram illustrating various structures of a pressure sensor included in a display of an electronic device according to various embodiments of the present disclosure.

With reference to FIG. 8, according to various embodiments of the present disclosure, the display 160 of the electronic device 101 may, for example, and without limitation, include an induction type pressure sensor. For example, the induction type pressure sensor may include an inductor 810. The induction type pressure sensor may detect a pressure based on a change in a current induced in the inductor (e.g., coil) corresponding to a pressure applied to the display 160. For example, as the conductor (e.g., metal housing, user finger) approaches the inductor (e.g., coil) mounted within the display 160 by a pressure applied to the display 160, an induction current may increase.

With reference to FIG. 8, according to various embodiments of the present disclosure, the display 160 of the electronic device 101 may include a strain gauge type pressure sensor. For example, the strain gauge type pressure sensor may include a wiring 810 (e.g., conductor (resistor line)). The strain gauge type pressure sensor may detect a pressure based on a resistance of a conductor being changed to correspond to a pressure applied to the display 160. For example, as a length of the conductor increases by a pressure applied to the display 160, a cross-sectional area of the conductor is reduced; thus, resistance may increase. For example, the wiring 810 may be formed in a wheatstone bridge form.

Figure 9:
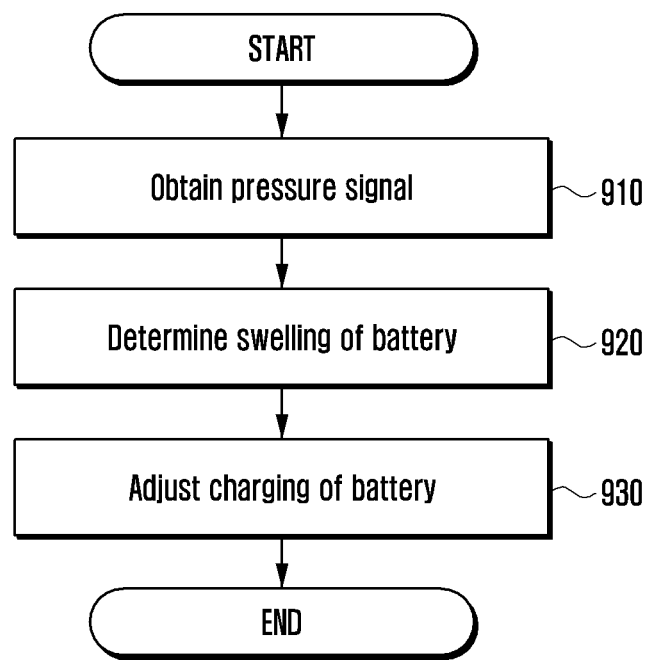
FIG. 9 is a flowchart illustrating a method of adjusting battery charging based on a swelling determination of a battery of an electronic device according to various embodiments of the present disclosure.

FIG. 9 is a flowchart illustrating a method of adjusting battery charging based on a swelling determination of a battery of an electronic device 101 according to various embodiments of the present disclosure.

According to various embodiments of the present disclosure, the electronic device 101 (e.g., the processor 450) may obtain a pressure signal at operation 910. For example, the electronic device 101 may obtain a pressure signal through the pressure sensor (e.g., 444).

According to various embodiments of the present disclosure, the electronic device 101 (e.g., the processor 450) may determine battery swelling at operation 920. For example, the electronic device 101 may determine whether the battery (e.g., 435) has swelled based on the pressure signal obtained at operation 910.

According to various embodiments of the present disclosure, the electronic device 101 (e.g., the processor 450) may adjust charging of the battery at operation 930. For example, the electronic device 101 may adjust charging of the battery (e.g., 435) based on battery swelling determined at operation 920.

Figure 10:
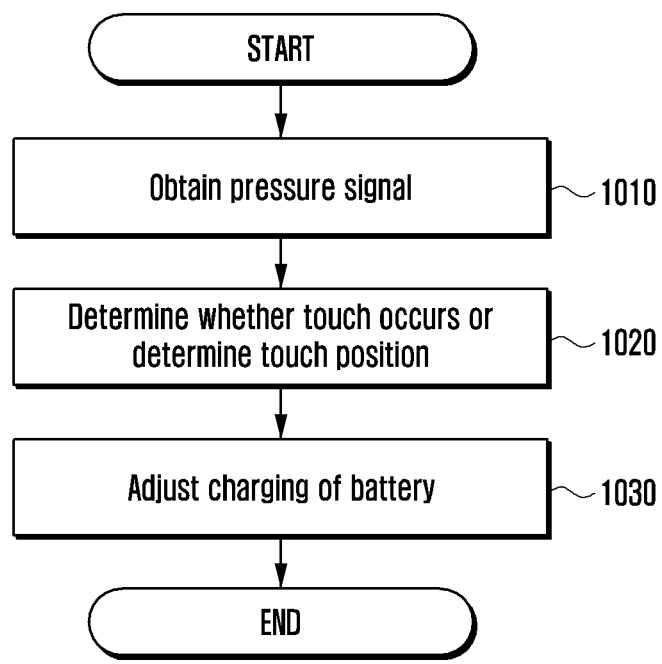
FIG. 10 is a flowchart illustrating a method of adjusting battery charging based on whether a touch has occurred in an electronic device or on a determination of a touch position according to various embodiments of the present disclosure.

FIG. 10 is a flowchart illustrating a method of adjusting battery charging based on whether a touch has occurred in an electronic device 101 or on a determination of a touch position according to various embodiments of the present disclosure.

According to various embodiments of the present disclosure, the electronic device 101 (e.g., the processor 450) may obtain a pressure signal at operation 1010. For example, the electronic device 101 may obtain a pressure signal through the pressure sensor (e.g., 444).

According to various embodiments of the present disclosure, the electronic device 101 (e.g., the processor 450) may determine whether a touch has occurred or determine a touch position at operation 1020. For example, the electronic device 101 may determine whether a user touch has occurred or determine a user touch position in the display (e.g., 440).

According to various embodiments of the present disclosure, the electronic device 101 (e.g., the processor 450) may adjust charging of the battery at operation 1030. For example, the electronic device 101 may adjust charging of the battery (e.g., 435) based on the determination at operation 1020 on whether a touch has occurred or the touch position was determined.

Figure 11:
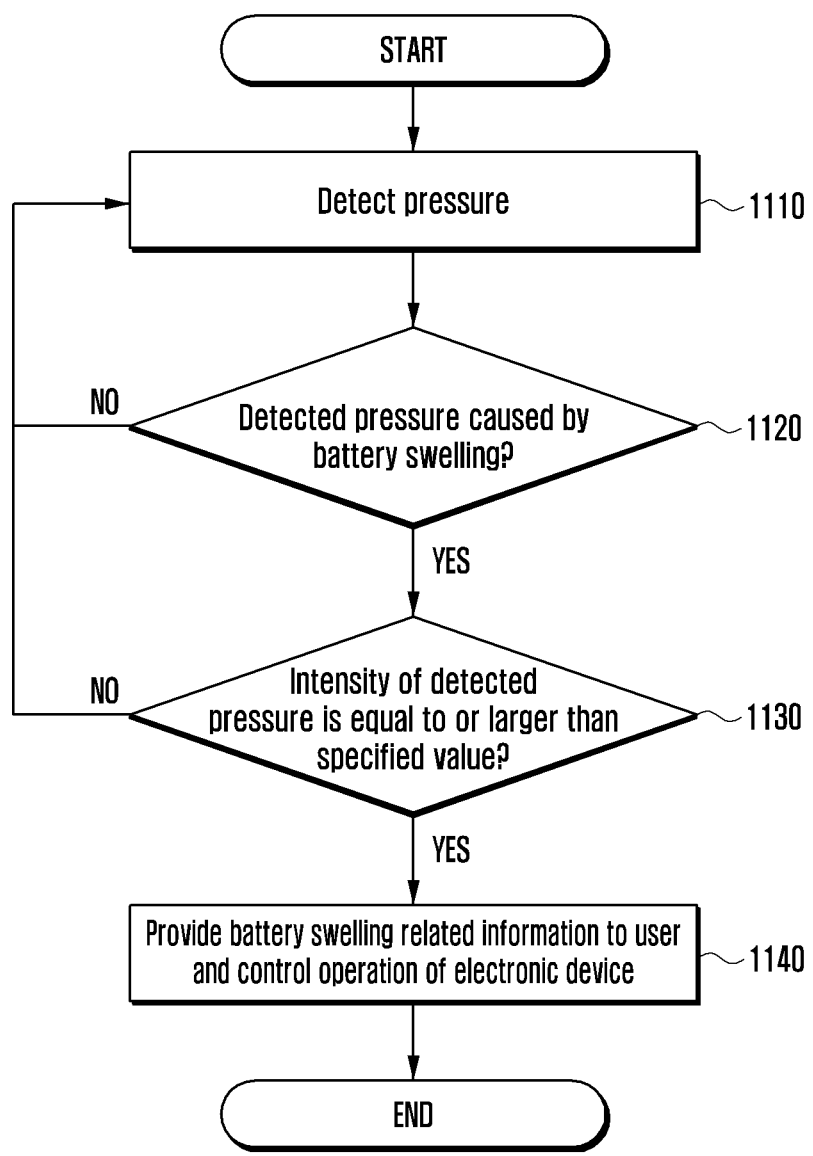
FIG. 11 is a flowchart illustrating a method of detecting swelling of a battery of an electronic device and controlling an operation of the electronic device to correspond to battery swelling according to various embodiments of the present disclosure.

FIG. 11 is a flowchart illustrating a method of detecting battery swelling of an electronic device and controlling an operation of the electronic device to correspond to battery swelling according to various embodiments of the present disclosure.

According to various embodiments of the present disclosure, the electronic device 101 (e.g., the processor 450) may detect a pressure through the pressure sensor at operation 1110.

According to various embodiments of the present disclosure, the electronic device 101 (e.g., the processor 450) may detect a pressure based on a sensor value measured by the pressure sensor mounted (disposed) in the display 160.

According to various embodiments of the present disclosure, the electronic device 101 (e.g., the processor 450) may detect a pressure based on the swelling gap (e.g., 520) in the display 160. For example, because the pressure sensor and the battery are separated by a swelling gap, even if battery swelling occurs, a distance between the first electrode (e.g., 710) and the second electrode (e.g., 730) of the pressure sensor may not be reduced. Further, when the distance between the first electrode (e.g., 710) and the second electrode (e.g., 730) of the pressure sensor may be reduced very minutely, this may be determined to be a simple error of a sensor value. In this case, the electronic device 101 may determine battery swelling based on at least a portion of a change in capacitance between the second electrode (e.g., 730, may refer, for example, to an electrode relatively adjacent to the battery among a plurality of electrodes of the pressure sensor) of the pressure sensor and a conductor disposed at an outer surface of the battery. For example, conductors disposed at an outer surface of the battery may be integrally formed with the battery cover (e.g., 540) or may be disposed at a separate support member (e.g., FPCB) attached to the outer surface of the battery.

According to various embodiments of the present disclosure, the electronic device 101 (e.g., the processor 450) may determine whether the detected pressure was caused by battery swelling at operation 1120.

According to various embodiments of the present disclosure, the electronic device 101 (e.g., the processor 450) may distinguish whether a sensor value measured by the pressure sensor is a sensor value arising from battery swelling, a sensor value arising from a user touch input, or a sensor value arising by other outer factors. For example, the electronic device 101 may distinguish sensor values based on a structural characteristic of the pressure sensor described with reference to FIGS. 7A to 7C or FIG. 8. Further, the electronic device 101 may determine battery swelling based on at least one of a temperature (e.g., an inner temperature or an outer temperature) thereof, a touch input on the display 160, and time information as well as detection through the pressure sensor.

According to various embodiments of the present disclosure, when the detected pressure is caused by battery swelling, the electronic device 101 (e.g., the processor 450) may determine at operation 1130 whether the intensity of the detected pressure is equal to or larger than a specified value.

According to various embodiments of the present disclosure, the electronic device 101 (e.g., the processor 450) may distinguish a battery swelling type based on at least a portion of intensity of the detected pressure. Further, the electronic device 101 may distinguish a battery swelling type in consideration of a sequential change amount of intensity of a pressure in addition to absolute intensity of a pressure. For example, the electronic device 101 may distinguish whether battery swelling is sudden swelling based on leakage within the battery or natural swelling based on battery deterioration.

According to various embodiments of the present disclosure, when intensity of a detected pressure is equal to or larger than a specified value, the electronic device 101 (e.g., the processor 450) may, at operation 1140, provide battery swelling related information to the user and a control operation of the electronic device to correspond to the battery swelling.

According to various embodiments of the present disclosure, when battery swelling has occurred, a safety accident, a problem of waterproofing and dustproofing, or a problem of use time reduction may occur; thus, the electronic device 101 (e.g., the processor 450) may notify the user of battery swelling related information. For example, the electronic device 101 may provide information to the user about a battery swelling level and a battery swelling type, an occurrence position of battery swelling, battery shape according to battery swelling, reduction of a use time according to battery swelling, whether a waterproof or dustproof function is supported, necessity of battery replacement, and a possibility of battery burnout and ignition.

According to various embodiments of the present disclosure, when battery swelling is detected, the electronic device 101 (e.g., the processor 450) may control at least a portion of a charging related operation. For example, when battery swelling has occurred in the electronic device 101, the electronic device 101 may adjust at least a portion of a battery charge voltage, charge current, and charge amount according to a battery swelling level to prevent additional battery swelling.

According to various embodiments of the present disclosure, when battery swelling is detected, the electronic device 101 (e.g., the processor 450) may adjust a resolution of the pressure sensor. When battery swelling has occurred in the electronic device 101, the pressure sensor is physically changed; thus, a resolution of pressure detection according to a user input may be limited. For example, in a normal case, when a pressure according to battery swelling is detected (e.g., 10 level) by the pressure sensor that can detect a pressure change of a 100 level, a pressure according to the battery swelling may operate as a default. Thereby, pressure detection according to a user input may be limited to a 90 level.

According to various embodiments of the present disclosure, to adjust a resolution of the pressure sensor, the electronic device 101 (e.g., the processor 450) may enhance sensitivity of the pressure sensor. For example, the electronic device 101 may divide a pressure detection segment corresponding to the remaining 90 levels into a 100 level to detect a pressure.

According to various embodiments of the present disclosure, to adjust a resolution of the pressure sensor, the electronic device 101 (e.g., the processor 450) may lower sensitivity of the pressure sensor. For example, the electronic device 101 may reduce a pressure detection segment corresponding to the remaining 90 levels to 45 levels to adjust a pressure detection segment such that a difference by sensitivity is not large when the user inputs, even if a resolution reduces. Thereby, the electronic device 101 may lower a level in which an error occurs from usage by the user.

According to various embodiments of the present disclosure, the electronic device 101 (e.g., the processor 450) may determine elements such as heat generation and battery swelling that have an influence on a sensor value measured by the pressure sensor and control a resolution or sensitivity of the pressure sensor using a lookup table of each element.

Figure 12:
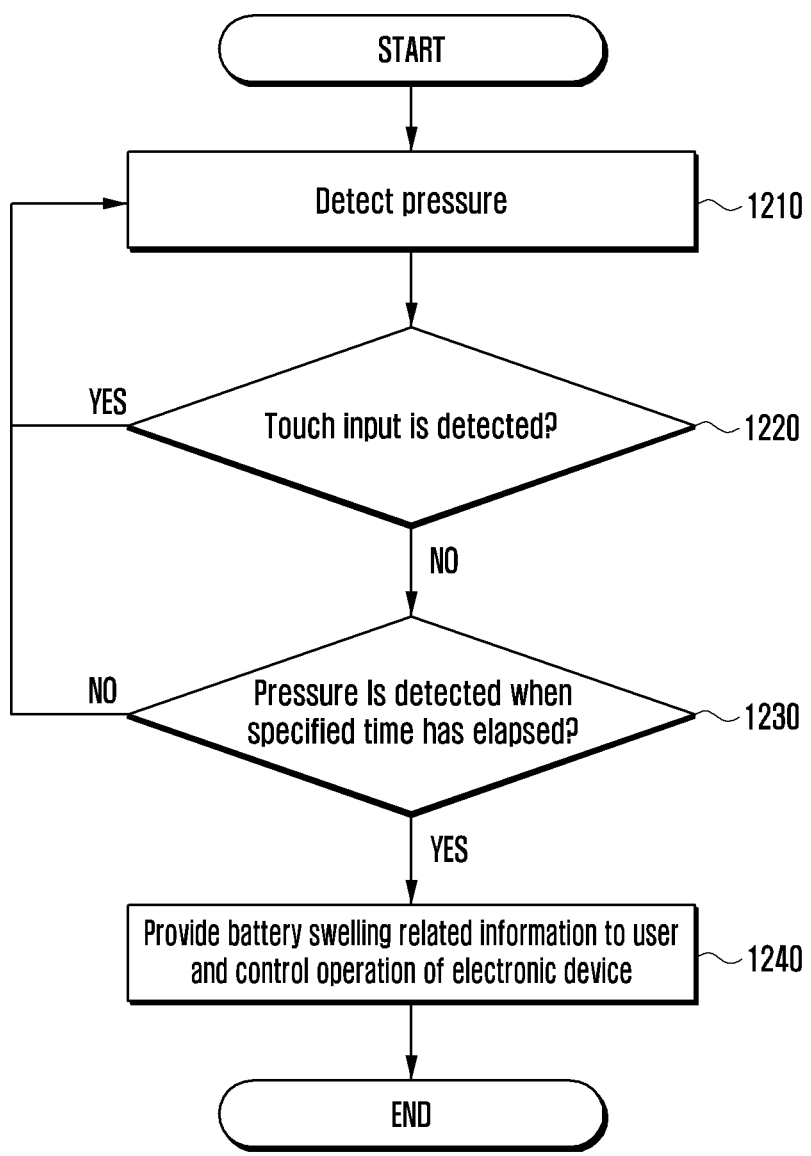
FIG. 12 is a flowchart illustrating a method of determining whether a pressure detected by a pressure sensor based on a predetermined time of an electronic device is caused by battery swelling according to various embodiments of the present disclosure.

FIG. 12 is a flowchart illustrating a method of determining whether a pressure detected by a pressure sensor based on a predetermined time of an electronic device is caused by battery swelling according to various embodiments of the present disclosure.

According to various embodiments of the present disclosure, the electronic device 101 (e.g., the processor 450) may detect a pressure through the pressure sensor at operation 1210.

According to various embodiments of the present disclosure, the electronic device 101 (e.g., the processor 450) may detect a pressure based on a sensor value measured by the pressure sensor mounted in the display 160.

According to various embodiments of the present disclosure, the electronic device 101 (e.g., the processor 450) may determine whether a touch input is detected at operation 1220. For example, by detecting a touch input, the electronic device 101 (e.g., the processor 450) may determine whether the detected pressure at operation 1210 is a pressure by battery swelling or a pressure by a user touch input.

According to various embodiments of the present disclosure, when a touch input is detected, the electronic device 101 (e.g., the processor 450) may additionally determine whether a touch position corresponds with a pressure position. For example, when a touch position corresponds with a pressure position, the detected touch input may be determined to be a touch pressure. Further, when a touch position does not correspond with a pressure position, the detected touch input may be determined to be a swelling pressure instead of a touch pressure.

According to various embodiments of the present disclosure, the electronic device 101 (e.g., the processor 450) may distinguish a touch input through a user's non-conductor (e.g., glove). For example, when the user applies a pressure to the cover window (e.g., 610) through the glove, the electronic device 101 may erroneously determine a corresponding pressure to a pressure by battery swelling. In this case, the electronic device 101 may distinguish a glove touch based on a change in a micro touch input value. For example, when the processor 450 of the electronic device 101 receives a pressure event from the pressure sensor 444, the processor 450 may request to report a touch input value of less than a specified value to the touch sensor 442 configured to report a touch event for a predetermined time only when a touch input value of a specified value or more is generally detected. Thereby, by detecting a change in a micro touch input value that may be detected by a glove touch, the processor 450 may distinguish a user glove touch from battery swelling.

According to various embodiments of the present disclosure, the electronic device 101 (e.g., the processor 450) may distinguish a moisture contact case to determine whether a touch input is detected. When moisture contacts the display 160 of the electronic device, battery swelling may not be appropriately determined. In this case, the processor 450 of the electronic device 101 may determine that a touch input value of a moisture contact portion is floated and determine this to be a moisture contact situation. For example, the processor 450 of the electronic device 101 may not determine whether the battery has swelled in a moisture contact situation in which a measurement value of the pressure sensor 444 may be minutely changed and may determine whether the battery has swelled when the moisture contact situation is released.

According to various embodiments of the present disclosure, when a touch input is not detected, at operation 1230 the electronic device 101 (e.g., the processor 450) may determine whether a pressure is detected when a specified time has elapsed.

According to various embodiments of the present disclosure, when a pressure sensor value is maintained for a predetermined time, the electronic device 101 (e.g., the processor 450) may determine this to be battery swelling. When a pressure sensor value changed within a predetermined time is restored to a value before change, the electronic device 101 (e.g., the processor 450) may determine that this is not a pressure caused by battery swelling.

According to various embodiments of the present disclosure, the electronic device 101 (e.g., the processor 450) may measure a pressure sensor value with a predetermined time period to determine whether the battery has swelled. For example, by measuring a pressure sensor value with a predetermined time period, when a changed pressure sensor value is continuously maintained or increases, the electronic device 101 determine this to be battery swelling. By measuring a pressure sensor value in a predetermined time period, when a changed pressure sensor value is restored to a value before change, the electronic device 101 may determine that the pressure is not a pressure caused by battery swelling.

According to various embodiments of the present disclosure, when a pressure is detected based on a predetermined time, the electronic device 101 (e.g., the processor 450) may provide battery swelling related information to the user and control an operation thereof to correspond to battery swelling at operation 1240.

Figure 13:
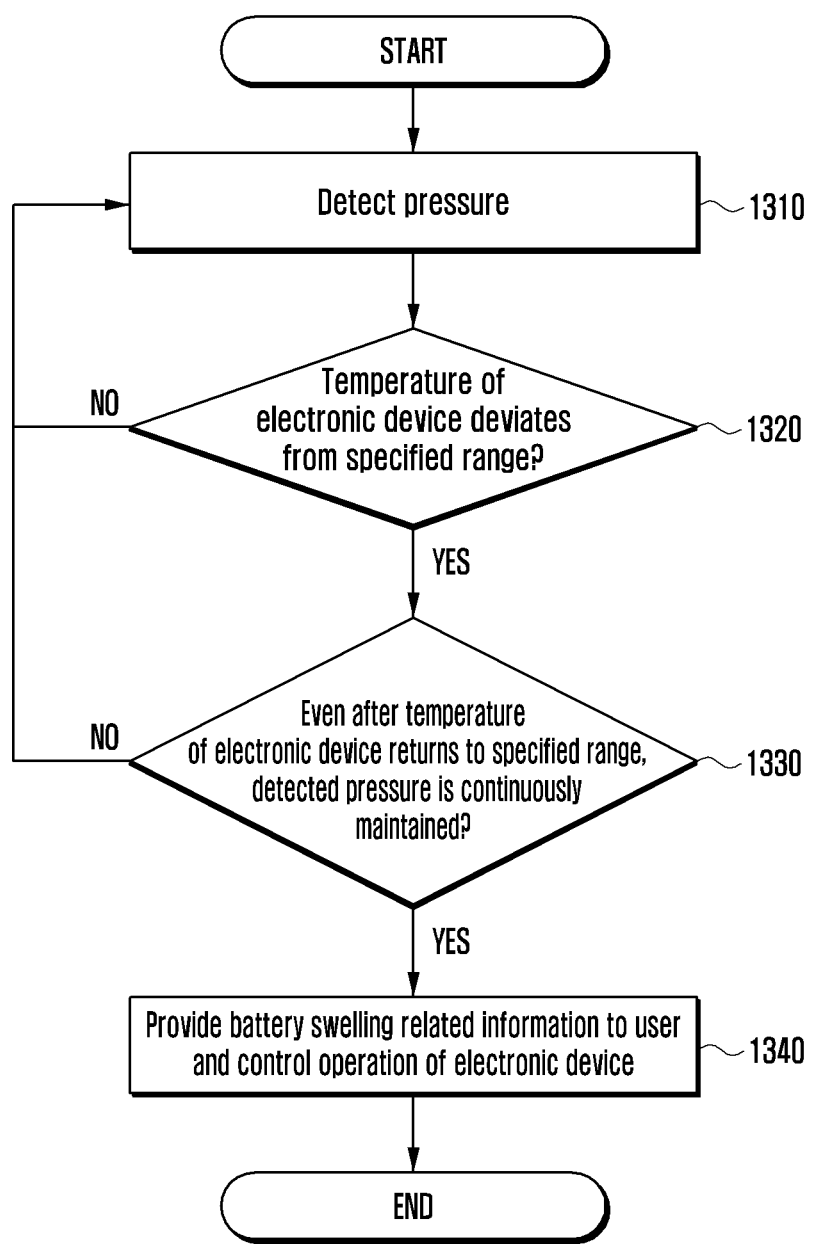
FIG. 13 is a flowchart illustrating a method of determining whether a pressure detected by a pressure sensor based on a temperature change of an electronic device is caused by battery swelling according to various embodiments of the present disclosure.

FIG. 13 is a flowchart illustrating a method of determining whether a pressure detected by a pressure sensor based on a temperature change of an electronic device is caused by battery swelling according to various embodiments of the present disclosure.

According to various embodiments of the present disclosure, the electronic device 101 (e.g., the processor 450) may detect a pressure through a pressure sensor at operation 1310.

According to various embodiments of the present disclosure, the electronic device 101 (e.g., the processor 450) may detect a pressure based on a sensor value measured by the pressure sensor mounted in the display 160.

According to various embodiments of the present disclosure, the electronic device 101 (e.g., the processor 450) may determine at operation 1320 whether a temperature of the electronic device 101 deviates from a specified range. In general, a pressure sensor value may be changed according to a kind, form, or property of a dielectric layer included in the pressure sensor and according to a temperature. Therefore, it may be necessary to distinguish a case in which a distance between the first electrode and the second electrode is changed by a temperature change and a case in which a distance between the first electrode and the second electrode is changed by battery swelling. For example, as a temperature (e.g., external temperature or internal temperature) of the electronic device 101 increases, a property of the dielectric layer may change. Thereby, a thickness of the dielectric layer may change. For another example, as at least a portion of the dielectric layer is deformed according to a temperature change, the distance between the first electrode and the second electrode may be partially changed. Accordingly, the distance between the first electrode and the second electrode gradually reduces; thus, this may be erroneously determined to be battery swelling.

According to various embodiments of the present disclosure, the electronic device 101 (e.g., the processor 450) may measure a pressure value (e.g., capacitance value) of a pressure sensor according to a temperature to store the pressure value at a lookup table. For example, when a pressure is detected by the pressure sensor, the electronic device 101 may determine whether the pressure is a pressure caused by battery swelling or a pressure caused by a temperature change with reference to a lookup table according to a temperature.

According to various embodiments of the present disclosure, when a temperature of the electronic device 101 deviates from a specified range, even after a temperature of the electronic device 101 is returned to a specified range, the electronic device 101 (e.g., the processor 450) may determine at operation 1330 whether a detected pressure is continuously maintained. For example, the electronic device 101 (e.g., the processor 450) may determine whether the pressure is a pressure caused by battery swelling or a pressure caused by a temperature change through whether a pressure detected by the pressure sensor is maintained even after the temperature recovers to a normal temperature.

According to various embodiments of the present disclosure, after a temperature returns to a specified range, when a detected pressure is continuously maintained, at operation 1340 the electronic device 101 (e.g., the processor 450) may provide battery swelling related information to the user and control an operation thereof to correspond to battery swelling.

Figure 14:
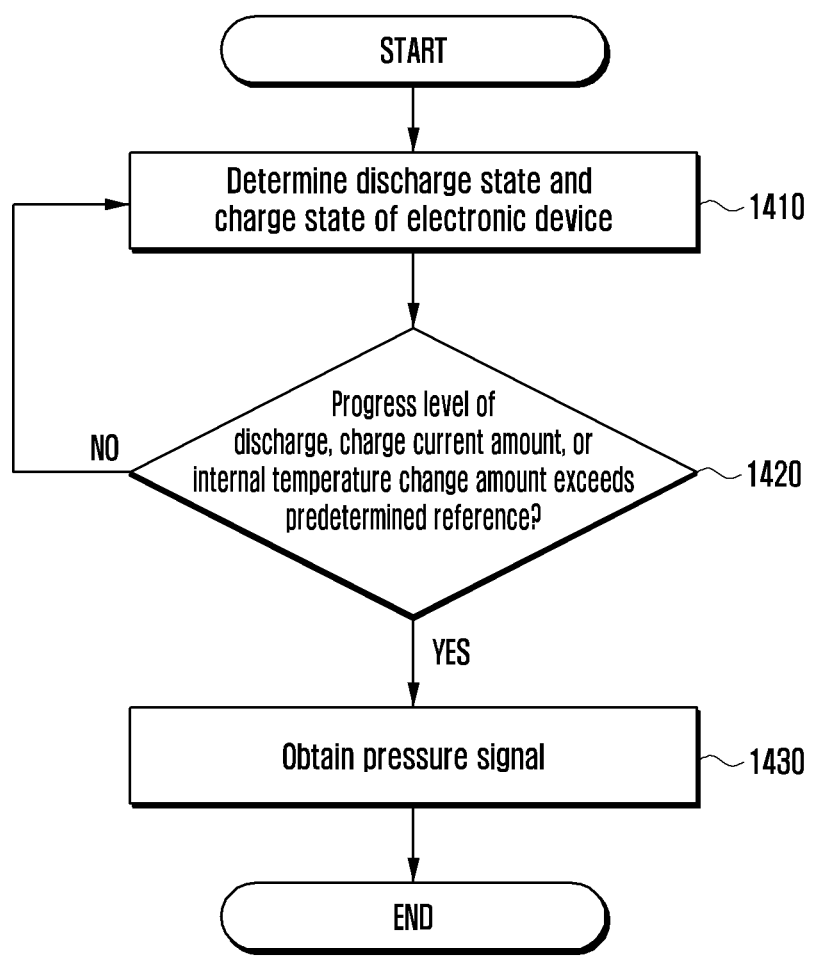
FIG. 14 is a flowchart illustrating a method in which an electronic device obtains a pressure signal according to various embodiments of the present disclosure.

FIG. 14 is a flowchart illustrating a method in which an electronic device obtains a pressure signal according to various embodiments of the present disclosure.

According to various embodiments of the present disclosure, the electronic device 101 (e.g., the processor 450) may determine a discharge state and a charge state thereof at operation 1410. For example, the electronic device 101 may determine a charge amount, charge voltage, charge current, or temperature change amount.

According to various embodiments of the present disclosure, the electronic device 101 (e.g., the processor 450) may determine whether a progress level of discharge, a charge current amount, or an internal temperature change amount exceeds a predetermined reference at operation 1420. For example, the electronic device 101 may detect a case of charging the battery with a high charge current, a case in which a temperature change amount rapidly increases for a predetermined time, or a case in which a battery rapidly discharges.

According to various embodiments of the present disclosure, when a progress level of discharge, a charge current amount, or an internal temperature change amount exceeds a predetermined reference, the electronic device 101 (e.g., the processor 450) may, at operation 1430, obtain a pressure signal.

Figure 15:
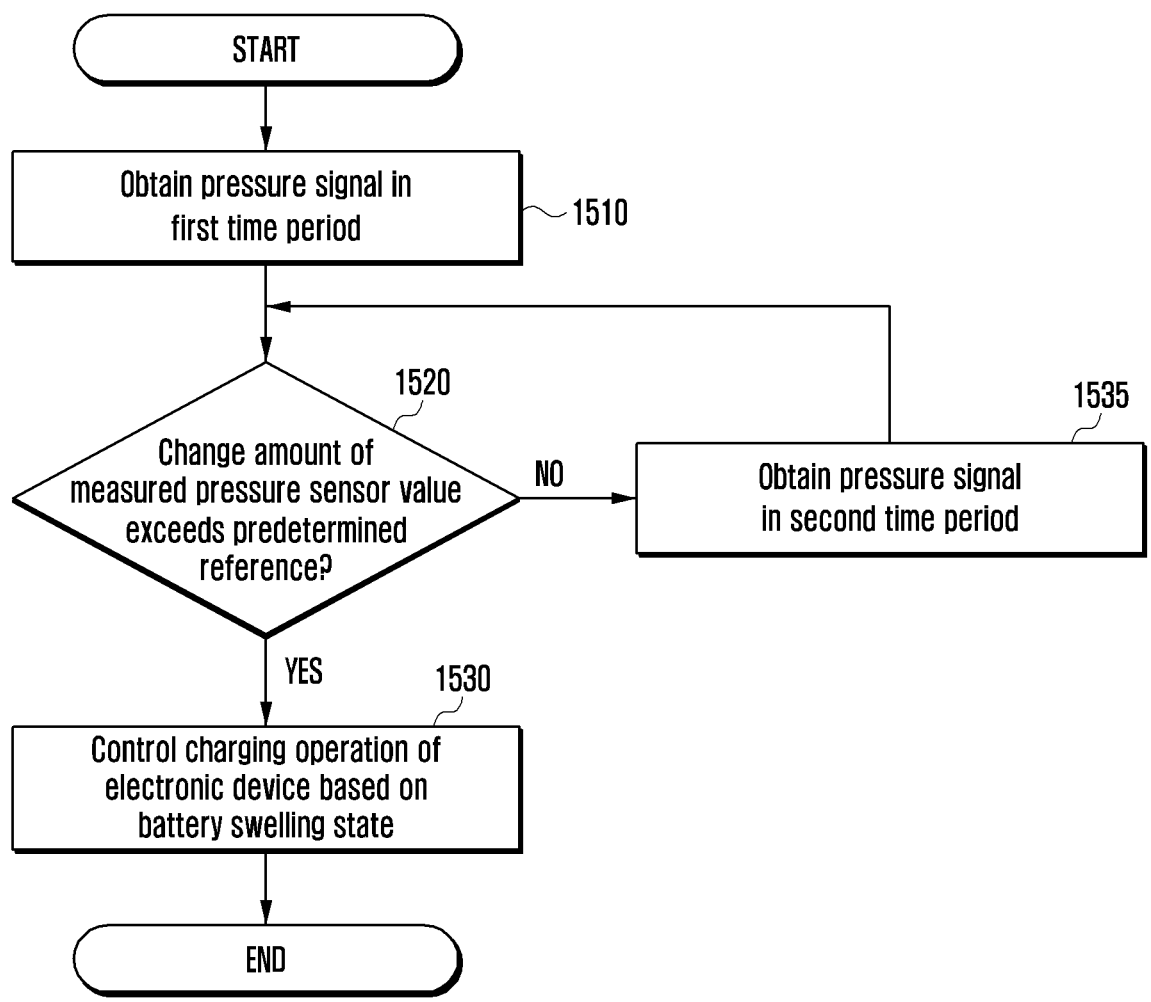
FIG. 15 is a flowchart illustrating a method of obtaining a pressure signal by changing a time period of an electronic device and controlling a charging operation based on a battery swelling state according to various embodiments of the present disclosure.

FIG. 15 is a flowchart illustrating a method of obtaining a pressure signal by changing a time period of an electronic device and controlling a charging operation based on a battery swelling state according to various embodiments of the present disclosure.

According to various embodiments of the present disclosure, the electronic device 101 (e.g., the processor 450 or the pressure sensor 444) may obtain a pressure signal in a first time period at operation 1510. For example, in a method of detecting battery swelling, the electronic device 101 may determine a pressure sensor value on a predetermined period basis. For example, the processor 450 or the pressure sensor 444 may change a determination period of a pressure sensor value according to an operation state of the electronic device 101.

According to various embodiments of the present disclosure, the electronic device 101 (e.g., the processor 450 or the pressure sensor 444) may change greatly (e.g., one hour interval) over a polling period in a screen off state, normally (e.g., 10 minute interval) a polling period in a screen on state, and very shortly (e.g., a minute interval) a polling period under a charging condition.

According to various embodiments of the present disclosure, the electronic device 101 (e.g., the processor 450 or the pressure sensor 444) may change a polling period according to an operation state of an application. For example, when executing an application having large heat generation or battery consumption, the electronic device 101 may change very shortly (e.g., a minute interval) a polling period. On the other hand, when executing an application having low heat generation or battery consumption, the electronic device 101 may change normally (e.g., 10 minute interval) a polling period.

According to various embodiments of the present disclosure, the electronic device 101 (e.g., the processor 450) may determine whether a change amount of a measured pressure sensor value exceeds a predetermined reference at operation 1520. For example, the electronic device 101 may determine whether absolute intensity of a pressure measured by the pressure sensor exceeds a specified reference. For another example, the electronic device 101 may determine whether a change amount according to a measurement period of a pressure measured by the pressure sensor exceeds a specified reference.

According to various embodiments of the present disclosure, the electronic device 101 (e.g., the processor 450) may determine a battery swelling type based on at least a portion of absolute intensity of a pressure measured by the pressure sensor or a change amount according to a measurement period of a pressure. For example, the electronic device 101 may divide battery swelling into a first battery swelling state (e.g., swelling according to battery internal leakage) and a second battery swelling state (e.g., swelling according to battery deterioration).

According to various embodiments of the present disclosure, when a change amount of a measured pressure sensor value does not exceed a predetermined reference, the electronic device 101 (e.g., the processor 450) may, at operation 1535, obtain a pressure signal in a second time period. For example, a second time period of the electronic device 101 may have a time interval larger than that of a first time period. For example, by slowly adjusting a polling period of the pressure sensor, the electronic device 101 may detect a second battery swelling state. In the second battery swelling state, battery swelling may occur slowly.

According to various embodiments of the present disclosure, when a change amount of a measured pressure sensor value exceeds a predetermined reference, the electronic device 101 (e.g., the processor 450) may, at operation 1530, control a charging operation thereof based on a battery swelling state.

According to various embodiments of the present disclosure, when a change amount of a pressure sensor value measured on a first time period basis exceeds a predetermined reference, the electronic device 101 may control an operation thereof according to a first battery swelling state. For example, the electronic device 101 (e.g., the processor 450) may stop or interrupt charging of the battery, minimize and/or reduce a full charge voltage, or minimize and/or reduce a discharging operation in the first battery swelling state. Further, the electronic device 101 may warn the user of the likelihood of a burnout or ignition of the battery and notify the user that a waterproof or dustproof function may not operate appropriately.

According to various embodiments of the present disclosure, when a change amount of a pressure sensor value measured in the second time period exceeds a predetermined reference, the electronic device 101 (e.g., the processor 450) may control an operation thereof according to a second battery swelling state. For example, the electronic device 101 (e.g., the processor 450) may set at least one of a charge current and a full charge voltage of the battery to be low in the second battery swelling state. Further, the electronic device 101 may notify the user that a waterproof or dustproof function may not operate appropriately and that a use time may be reduced according to deterioration of the battery.

Figure 16:
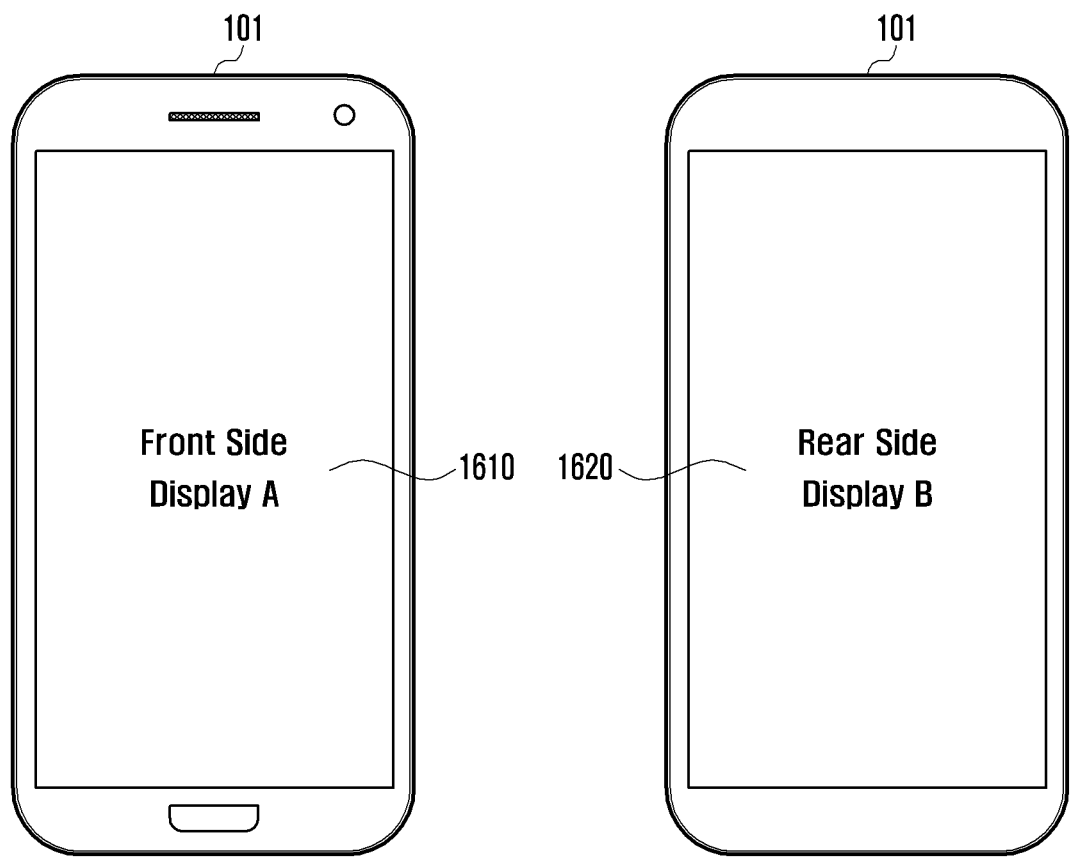
FIG. 16 is a diagram illustrating a structure in which an electronic device has a dual display according to various embodiments of the present disclosure.

FIG. 16 is a diagram illustrating a structure in which an electronic device has a dual display according to various embodiments of the present disclosure.

With reference to FIG. 16, according to various embodiments of the present disclosure, the electronic device 101 may have a dual display structure including displays at both surfaces including a front surface and a rear surface thereof.

According to various embodiments of the present disclosure, in an electronic device 101 with a dual display, a pressure sensor (e.g., 444) for a front display 1610 and a pressure sensor (e.g., 444) for a rear display 1620 may be separately received, and the battery (e.g., 435) may be mounted between the front display 1610 and the rear display 1620. In such a case, for example, the electronic device 101 may determine whether a battery has swelled and whether battery swelling has occurred at the front surface, the rear surface, or both directions of the electronic device 101 based on whether a pressure signal is detected through either the pressure sensor for the front display 1610 or the pressure sensor for the rear display 1620.

An electronic device according to various embodiments includes a battery (e.g., 435); a display (e.g., 440); a touch sensor (e.g., 442) configured to detect a touch on the display; a pressure sensor (e.g., 444) disposed between the display and the battery configured to detect a pressure on the display; and a processor (e.g., 450), wherein the processor is configured to obtain a pressure signal using the pressure sensor, to determine whether a touch signal has occurred and/or determine a position of a touch signal corresponding to the touch obtained through the touch sensor and whether the position of the touch signal is related to the obtaining of the pressure signal, and to adjust at least one characteristic related to charge of the battery based on at least a portion of the position and/or whether the pressure signal and the touch signal have occurred.

The processor (e.g., 450) may determine swelling of the battery (e.g., 435) based on at least a portion of the pressure signal as at least a portion of the adjustment operation.

If the touch signal is not obtained, when the pressure signal is obtained, the processor (e.g., 450) may determine swelling of the battery (e.g., 435).

The processor (e.g., 450) may perform the obtaining operation of the pressure signal in a specified period and determine a change amount of the swelling of the battery (e.g., 435) based on at least a portion of a change amount of the obtained pressure signal according to the specified period.

The processor (e.g., 450) may detect the touch of the display (e.g., 440) through the touch sensor (e.g., 442) related to the obtaining of the pressure signal, determine a level of the swelling of the battery (e.g., 435) based on at least a portion of the pressure signal as at least a portion of the determining operation, and correct a touch pressure corresponding to the touch based on at least a portion of a pressure corresponding to the level of the swelling.

The processor (e.g., 450) may provide information related to the swelling through the display (e.g., 440).

The processor (e.g., 450) may perform the determining operation based on the pressure signal being maintained for a specified time.

The processor (e.g., 450) may perform the acquiring operation of the pressure signal while charging the battery.

The processor (e.g., 450) may stop the charging as at least a portion of the adjusting operation.

The processor (e.g., 450) may adjust a current or voltage for use in the charging as at least a portion of the adjusting operation.

A method of controlling an electronic device according to various embodiments includes obtaining a pressure signal using a pressure sensor disposed between a display and a battery (e.g., 435) configured to detect a pressure on the display; determining whether a touch signal has occurred and/or determining a position of a touch signal corresponding to the touch obtained through a touch sensor (e.g., 442) configured to detect a touch on the display, and whether the position of the touch signal is related to the obtaining of the pressure signal; and adjusting at least one characteristic related to charging of the battery mounted in the electronic device based on at least a portion of the position or whether the pressure signal and the touch signal have occurred.

Adjusting at least one characteristic related to charging of the battery (e.g., 435) mounted in the electronic device may include determining swelling of the battery (e.g., 435) based on at least a portion of the pressure signal.

Adjusting at least one characteristic related to charging of the battery mounted in the electronic device may include performing the determination when the pressure signal is obtained while the touch signal is not obtained.

An electronic device according to various embodiments includes a battery (e.g., 435); a display (e.g., 440); a touch sensor (e.g., 442) configured to detect a touch on the display; a pressure sensor (e.g., 444) disposed between the display and the battery configured to detect at least one of a touch pressure on the display and a swelling pressure by battery swelling; and a processor (e.g., 450), wherein the processor is configured to detect the swelling pressure caused by swelling of the battery using the pressure sensor and to adjust at least one characteristic related to charging of the battery when the swelling pressure satisfies a specified condition.

The processor (e.g., 450) may determine the pressure detected while the touch is not detected to be the swelling pressure.

The processor (e.g., 450) may detect the touch pressure corresponding to the touch through the pressure sensor (e.g., 444) and correct the touch pressure based on at least a portion of the swelling pressure.

The processor (e.g., 450) may perform the adjusting operation based on the swelling pressure being maintained for a specified time.

The processor (e.g., 450) may perform the detecting operation of the swelling pressure while charging the battery (e.g., 435).

The processor (e.g., 450) may stop the charging of the battery (e.g., 435) as at least a portion of the adjusting operation.

The processor (e.g., 450) may adjust a current or voltage for the charging of the battery (e.g., 435) as at least a portion of the adjusting operation.

According to various embodiments of the present disclosure, swelling of a battery of a mobile terminal can be detected and a safety accident that may be caused by battery swelling can be prevented.

According to various embodiments of the present disclosure, because a battery having a reduced capacity by battery swelling can be replaced early, user inconvenience by reduction in a use time of a mobile terminal can be alleviated.

The term "module" used in the present disclosure may refer, for example, to a unit including one or more combinations of hardware, software, and firmware. The "module" may be interchangeable with a term, such as "unit," "logic," "logical block," "component," or "circuit". The "module" may be a minimum unit of a component formed as one body or a part thereof, may be a minimum unit for performing one or more functions or a part thereof, and may be implemented mechanically or electronically. For example, the "module" according to an example embodiment of the present disclosure may include, for example, and without limitation, at least one of a dedicated processor, a CPU, an application-specific integrated circuit (ASIC) chip, a field-programmable gate array (FPGA), and a programmable-logic device, or the like, for performing certain operations which have been known or are to be developed in the future.

Examples of computer-readable media include: magnetic media, such as hard disks, floppy disks, and magnetic tape; optical media such as compact disc read only memory (CD-ROM) disks and digital versatile disc (DVD), magneto-optical media, such as floptical disks, and hardware devices that are specially configured to store and perform program instructions, such as ROM, RAM, and flash memory. Examples of program instructions include machine code instructions created by assembly languages, such as a compiler, and code instructions created by a high-level programming language executable in computers using an interpreter. The described hardware devices may be configured to act as one or more software modules to perform the operations and methods described above, or vice versa.

Modules or programming modules according to example embodiments of the present disclosure may include one or more components, remove part of the components described above, or include new components. The operations performed by modules, programming modules, or the other components, according to the present disclosure, may be executed in serial, parallel, repetitive or heuristic fashion. Part of the operations can be executed in any other order, omitted, or executed with additional operations.

Although various example embodiments of the disclosure have been described in detail above, it should be understood that many variations and modifications of the disclosure herein described, which may be apparent to those skilled in the art, will still fall within the spirit and scope of the embodiments of the disclosure as defined in the appended claims and their equivalents.

What is claimed is:

1. An electronic device, comprising:
    a battery;
    a touch sensor configured to detect a touch on a display;
    a pressure sensor disposed between the display and the battery, wherein the pressure sensor is configured to detect a pressure from swelling of the battery on the display; and a processor,
    wherein the processor is configured to: obtain a pressure signal generated by a pressure from the swelling of the battery detected by the pressure sensor, the pressure signal including information on a detection position of the pressure,
    identify, in response to the obtaining of the pressure signal, a touch signal generated by a touch detected by the touch sensor, the touch signal including information on a position of the touch, and
    when the detected touch position corresponds with the detected pressure position, the pressure signal may be determined to be a touch pressure,
    when the detected touch position does not correspond with the detected pressure position, the pressure signal may be determined to be a swelling pressure instead of a touch pressure,
    adjust at least one characteristic related to charging of the battery based on at least a portion of the pressure signal and the touch information and based on whether the pressure signal is determined to be a swelling pressure or a touch pressure.

2. The electronic device of claim 1, wherein the processor is configured to determine swelling of the battery based on at least a portion of the pressure signal as at least a portion of the adjusting.

3. The electronic device of claim 2, wherein the processor is configured to determine swelling of the battery when the pressure signal is obtained while the touch signal is not obtained.

4. The electronic device of claim 3, wherein the processor is configured to:

perform the obtaining of the pressure signal in a specified period, and determine a change amount of the swelling of the battery based on at least a portion of a change amount of the obtained pressure signal based on the specified period.

5. The electronic device of claim 2, wherein the processor is configured to:

detect the touch of the display through the touch sensor and whether the touch is related to the obtaining of the pressure signal, determine a level of the swelling of the battery based on at least a portion of the pressure signal as at least a portion of the determining, and correct a touch pressure corresponding to the touch based on at least a portion of a pressure corresponding to the level of the swelling.

6. The electronic device of claim 2, wherein the processor is configured to provide information related to the swelling through the display.

7. The electronic device of claim 2, wherein the processor is configured to perform the determining based on the pressure signal being maintained for a specified time.

8. The electronic device of claim 1, wherein the processor is configured to acquire the pressure signal while charging the battery.

9. The electronic device of claim 8, wherein the processor is configured to stop the charging as at least a portion of the adjusting.

10. The electronic device of claim 8, wherein the processor is configured to adjust a current or voltage for use in the charging as at least a portion of the adjusting.

* * * * *